United States Patent
Ishida et al.

(10) Patent No.: US 6,646,820 B1
(45) Date of Patent: Nov. 11, 2003

(54) METHOD FOR RECORDING MAGNETIC RECORDING MEDIUM

(75) Inventors: Tatsuaki Ishida, Shiga (JP); Taizou Hamada, Osaka (JP); Hideyuki Hashi, Osaka (JP); Keizo Miyata, Osaka (JP); Yasuaki Ban, Osaka (JP); Hiromi Kita, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 338 days.

(21) Appl. No.: 09/869,947

(22) PCT Filed: Nov. 13, 2000

(86) PCT No.: PCT/JP00/08006

§ 371 (c)(1), (2), (4) Date: Jul. 3, 2001

(87) PCT Pub. No.: WO01/37268

PCT Pub. Date: May 25, 2001

(30) Foreign Application Priority Data

Nov. 15, 1999 (JP) .......................................... 11-324598
Nov. 1, 2000 (JP) ...................................... 2000-334447

(51) Int. Cl.$^7$ ............................ G11B 5/86; G11B 5/127
(52) U.S. Cl. ........................................ 360/17; 360/125
(58) Field of Search ........................... 360/15–17, 122, 360/125; G11B 5/86, 5/127

(56) References Cited

U.S. PATENT DOCUMENTS 5,923,484 A * 7/1999 Washino et al. ............... 360/15
6,469,848 B1 * 10/2002 Hamada et al. ............... 360/17

FOREIGN PATENT DOCUMENTS

| EP | 0 915 456 | 5/1999 |
|---|---|---|
| JP | 2-83285 A | 3/1990 |
| JP | 2-297081 | 7/1990 |
| JP | 4-98605 | 3/1992 |
| JP | 8-30915 | 2/1996 |
| JP | 10-40544 | 2/1998 |
| JP | 10-233006 | 2/1998 |
| JP | 7-220278 | 8/2001 |

* cited by examiner

Primary Examiner—David Hudspeth
Assistant Examiner—Dan I Davidson
(74) Attorney, Agent, or Firm—Merchant & Gould P.C.

(57) ABSTRACT

A master information carrier (2) with an arranged pattern formed of a ferromagnetic film in a shape corresponding to information signals is superposed on a magnetic recording medium (1) and the arranged pattern formed of a ferromagnetic film is magnetized with a magnetizing head (6), thus transfer-recording the arranged pattern into the magnetic recording medium as a magnetized pattern. The magnetizing head includes an annular magnetic circuit with a gap, and a strength of a magnetic field applied to the master information carrier by magnetic flux leaking from portions other than the gap is set to be 20% or less of that of a magnetic field applied to the master information carrier by magnetic flux leaking from the gap. Quality deterioration due to various conditions during recording can be prevented and uniform recording with less variation depending on position on the magnetic recording medium is achieved.

23 Claims, 20 Drawing Sheets

FIG. 16A
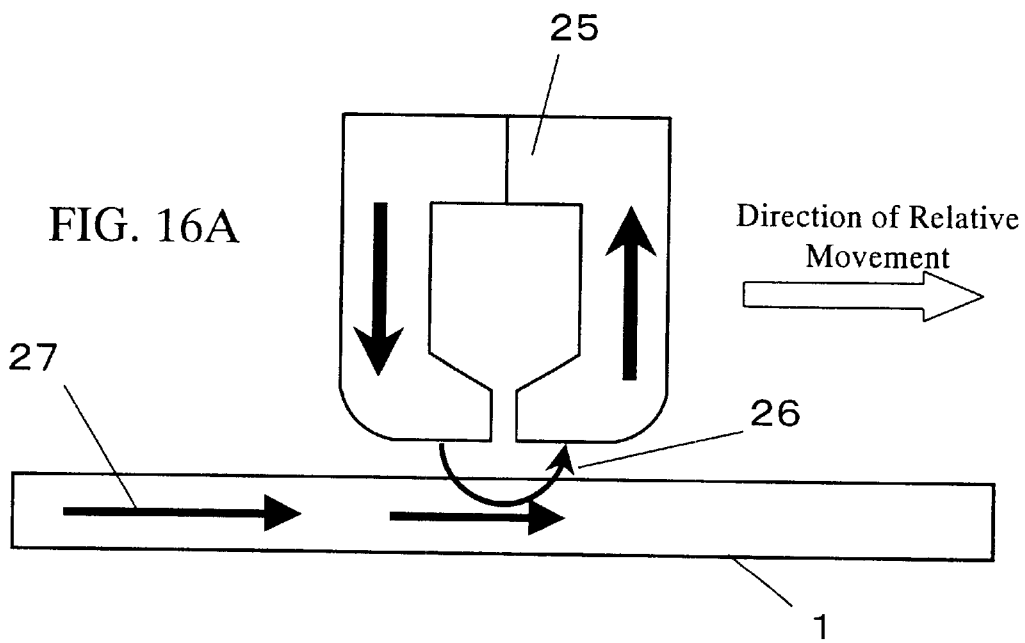
Direction of Relative Movement
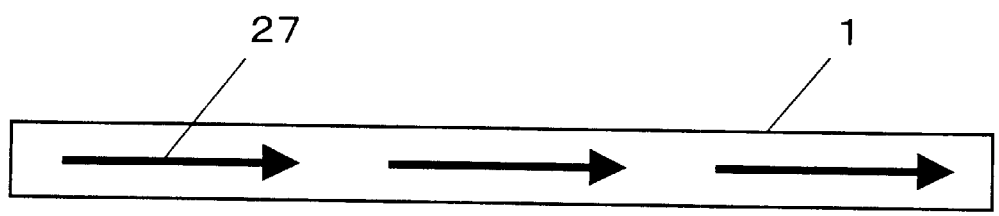
FIG. 16B

After Direct Current Erasing

After Transfer Recording of Signal

METHOD FOR RECORDING MAGNETIC RECORDING MEDIUM

TECHNICAL FIELD

The present invention relates generally to a method of magnetically recording predetermined information signals on a magnetic recording medium used in a magnetic recording/reproducing device.

BACKGROUND ART

Recently, a magnetic recording/reproducing device has been increasing in recording density in order to achieve a small size and large capacity. Especially, in the field of a hard disk drive used as a typical magnetic memory, apparatuses with an areal recording density of more than ten gigabits per square inch (15.5 Mbits/mm$^2$) are already available on the market. Practical use of memories with an areal recording density of 20 gigabits per square inch (31.0 Mbits/mm$^2$) has been discussed. Thus, the technique in this field has been progressing rapidly.

One of the technical features that has enabled such high recording density is the increasing linear recording density due to the improvements of a medium performance and a head-disk interface performance, and the advent of a new signal processing method such as "partial response". Recently, however, the rate of increase in track density exceeds that of linear recording density greatly, which is a primary factor for the increase in areal recording density. The practical use of a magneto-resistive type head, which is superior to a conventional inductive type magnetic head in reproduction-amplitude performance by far, has contributed to the increase in track density and has enabled the reproduction of signals from a track whose width is a few microns or less, with a high S/N ratio. It is expected that the track pitch will reach the sub micron range in the near future along with further improvement of the head performance.

In order that a head scans such narrow tracks correctly to reproduce signals with a high S/N ratio, a technique of tracking servo of the head plays an important role. A hard disk drive to which such a tracking servo technique is applied has areas (hereafter referred to as "preformat") where a tracking servo signal, an address data signal, and a reproduction clock signal are recorded at predetermined angles over the circumference of a disk, that is, over 360 degrees. The magnetic head reproduces such signals every predetermined interval, so that the magnetic head can scan a track correctly while the head position is verified and corrected.

A tracking servo signal, an address data signal, and a reproduction clock signal are to be reference signals for the magnetic head to scan a track correctly. Therefore, precise positioning accuracy is required in recording the signals. In a conventional hard disk drive, a disk is incorporated into the drive, and then using a special servo recording apparatus, preformat recording is carried out with a magnetic head whose position is controlled precisely.

In the preformat recording of a servo signal, an address data signal, a reproduction clock signal, and the like using a magnetic head as described above, there have been problems as follows.

First, the recording using a magnetic head is basically linear recording utilizing the relative movement between the magnetic head and a magnetic recording medium, and therefore, in the above-mentioned method of recording using the special servo recording apparatus while the magnetic head position is controlled precisely, preformat recording takes a long time and the servo recording apparatus is quite expensive, thus increasing the cost.

Second, there is a problem in that due to the spacing between a magnetic head and a recording medium and diffusion of the recording magnetic field caused by the shape of a pole provided in the magnetic head, magnetization at the track edges of the recorded preformat signals lacks steepness in transition. In a current tracking servo technique, a head position is detected based on a change amount of reproduction amplitude when the magnetic head deviates from a track to be scanned. Therefore, it is required not only that the head scans a track correctly with a high S/N ratio as in reproducing data signals recorded in an area between servo areas, but also that in a signal track formed by the preformat recording, the magnitude of reproduction amplitude is steeply changed when the magnetic head deviates from a track to be scanned, i.e. the off-track characteristic is steep. The above-mentioned problems go against these requirements and make it difficult to carry out the precise tracking servo technique in the submicron track recording expected in the future.

In order to solve the aforementioned problems in the conventional preformat recording using a magnetic head, the following method has been disclosed.

For instance, JP 10-40544 A discloses the following method. That is, magnetic portions of a ferromagnetic material are formed on a substrate in a pattern corresponding to information signals, which then is used as a master information carrier. The surface of the master information carrier is brought into contact with a surface of a sheet-like or disc-shaped magnetic recording medium on which a ferromagnetic film or a ferromagnetic powder coating layer is formed, and a predetermined magnetic field is applied. Then, the magnetized pattern corresponding to the information signals formed in the master information carrier is recorded into a magnetic recording medium.

In the method disclosed in JP 10-40544 A, with a recording magnetic field generated from the ferromagnetic film on the surface of the master information carrier magnetized in one direction, a magnetized pattern corresponding to the ferromagnetic film pattern in the master information carrier is transfer-recorded into the magnetic recording medium. In other words, a ferromagnetic film pattern corresponding to a tracking servo signal, an address data signal, a reproduction clock signal, or the like is formed on the surface of the master information carrier by photolithography or the like, so that preformat corresponding to the pattern can be recorded on the magnetic recording medium.

The conventional recording with a magnetic head is basically a dynamic track recording based on the relative movement between the head and a medium. On the contrary, the method described above is characterized by a static area recording without being accompanied by relative movement between the master information carrier and a medium. With such a characteristic, the technique disclosed in JP 10-40544

A can provide the following quite useful effects with respect to the aforementioned problems in a preformat recording.

First, since the areal recording is employed, a significantly shorter time is required for the preformat recording as compared to that in a conventional recording method using a magnetic head. In addition, the expensive servo recording apparatus for carrying out recording while the magnetic head position is controlled precisely is not required. Consequently, the productivity in the preformat recording can be increased considerably and the production cost can be reduced.

Second, since the static recording is carried out without being accompanied by relative movement between the master information carrier and a medium, the surface of the master information carrier and the surface of a magnetic recording medium can be brought into close contact with each other, thus minimizing the spacing between the both in recording. Furthermore, since no diffusion of the recording magnetic field due to the shape of a pole provided in the magnetic head is caused, magnetization at the track edges of the recorded preformat signals has excellent steepness in transition compared to the case of recording with a conventional magnetic head, thus achieving more accurate tracking.

In the recording of information signals using such a magnetic transfer technique, an arranged pattern corresponding to information signals provided in a master information carrier is transfer-recorded into a magnetic recording medium as a magnetized pattern at one time. Therefore, it is important that high density information signals are recorded uniformly and stably throughout the whole area of the magnetic recording medium.

DISCLOSURE OF THE INVENTION

The present invention is intended to record high density information signals uniformly and stably in a magnetic recording medium, particularly a disc-shaped magnetic recording medium such as a fixed hard disk medium, a removable hard disk medium, a large capacity flexible medium, or the like, with high productivity in a short time.

A method of recording magnetically on a magnetic recording medium of the present invention is based on a method in which using a master information carrier with an arranged pattern formed of magnetic portions of a ferromagnetic film on a substrate in a shape corresponding to predetermined information signals, the master information carrier is superposed on a magnetic recording medium with the magnetic portions facing the magnetic recording medium and the magnetic portions of the master information carrier are magnetized with a magnetizing head, thus transfer-recording the arranged pattern formed in the master information carrier into the magnetic recording medium as a magnetized pattern. In order to solve the above-mentioned problems, the magnetizing head includes an annular magnetic circuit with a gap, and a strength of a magnetic field applied to the master information carrier by magnetic flux leaking from portions other than the gap is set to be 20% or less of that of a magnetic field applied to the master information carrier by magnetic flux leaking from the gap. According to the present invention with this basic structure, signal information in an arranged pattern provided in the master information carrier can be transfer-recorded throughout the magnetic recording medium as signal information in a magnetized pattern uniformly and stably without causing deterioration in signal quality.

In the method with the above-mentioned structure, preferably, prior to the transfer-recording using the master information carrier, a magnetic field for direct current erasing is applied to the magnetic recording medium with a magnetizing head to magnetize the magnetic recording medium in one direction, then the master information carrier is superposed on the magnetic recording medium magnetized in the one direction, and a magnetic field in an opposite direction to that of the magnetic field for direct current erasing is applied to the magnetic portions of the master information carrier with the magnetizing head, thus transfer-recording the arranged pattern formed in the master information carrier into the magnetic recording medium as a magnetized pattern.

In the above-mentioned method, the magnetizing head includes a first magnetic core half and a second magnetic core half, the first magnetic core half and the second magnetic core half oppose each other to form an annular magnetic circuit with a gap, and the magnetizing head is designed to have one of the following shapes so that a strength of a magnetic field applied to the master information carrier by magnetic flux leaking from portions other than the gap is suppressed to be 20% or less of that of a magnetic field applied to the master information carrier by magnetic flux leaking from the gap.

That is, an outer periphery in a cross-section parallel to an annular magnetic path of the magnetic circuit has a substantially polygonal shape in which at least vertexes adjacent to the gap have a curved shape with a curvature of a radius of at least 0.5 mm.

Alternatively, an outer periphery in a cross-section parallel to an annular magnetic path of the magnetic circuit may have a substantially polygonal shape in which at least vertexes adjacent to the gap have an interior angle of at least 100 degrees.

Alternatively, an outer periphery in a cross-section parallel to an annular magnetic path of the magnetic circuit may have a substantially polygonal shape with a supposed vertex positioned on a center line of the gap in the vicinity of the gap and the supposed vertex has an internal angle in a range between 100 and 170 degrees. The sides adjacent to the supposed vertex on the center line of the gap in the magnetizing head may have an outwardly curved shape.

Alternatively, an outer periphery in a cross-section parallel to an annular magnetic path of the magnetic circuit may have a substantially elliptical shape with no vertex.

In the aforementioned configuration, at least one of the first magnetic core half and the second magnetic core half of the magnetizing head may be formed of a permanent magnet. Alternatively, the first magnetic core half and the second magnetic core half of the magnetizing head may be positioned to oppose each other while sandwiching a permanent magnet therebetween. Alternatively, a coil for direct current excitation may be provided around at least one of the first magnetic core half and the second magnetic core half of the magnetizing head.

A magnetic recording/reproducing device can be provided, which includes a magnetic recording medium that has been subjected to preformat recording using the method according to the above-mentioned configuration.

Moreover, a hard disk drive also can be provided, which includes a disc-shaped magnetic recording medium incorporated therein, in which a magnetized pattern of predetermined information signals has been transfer-recorded into a magnetic film using the method with the above-mentioned configuration.

BRIEF DESCRIPTION OF DRAWINGS

FIGS. 16A and 16B show schematic views illustrating a direct current erasing process when the magnetizing head shown in FIG. 15 is used.

BEST MODE FOR CARRYING OUT THE INVENTION

First Embodiment

A method of recording magnetically on a magnetic recording medium according to a first embodiment of the present invention is described with reference to the drawings as follows.

Figure 1:
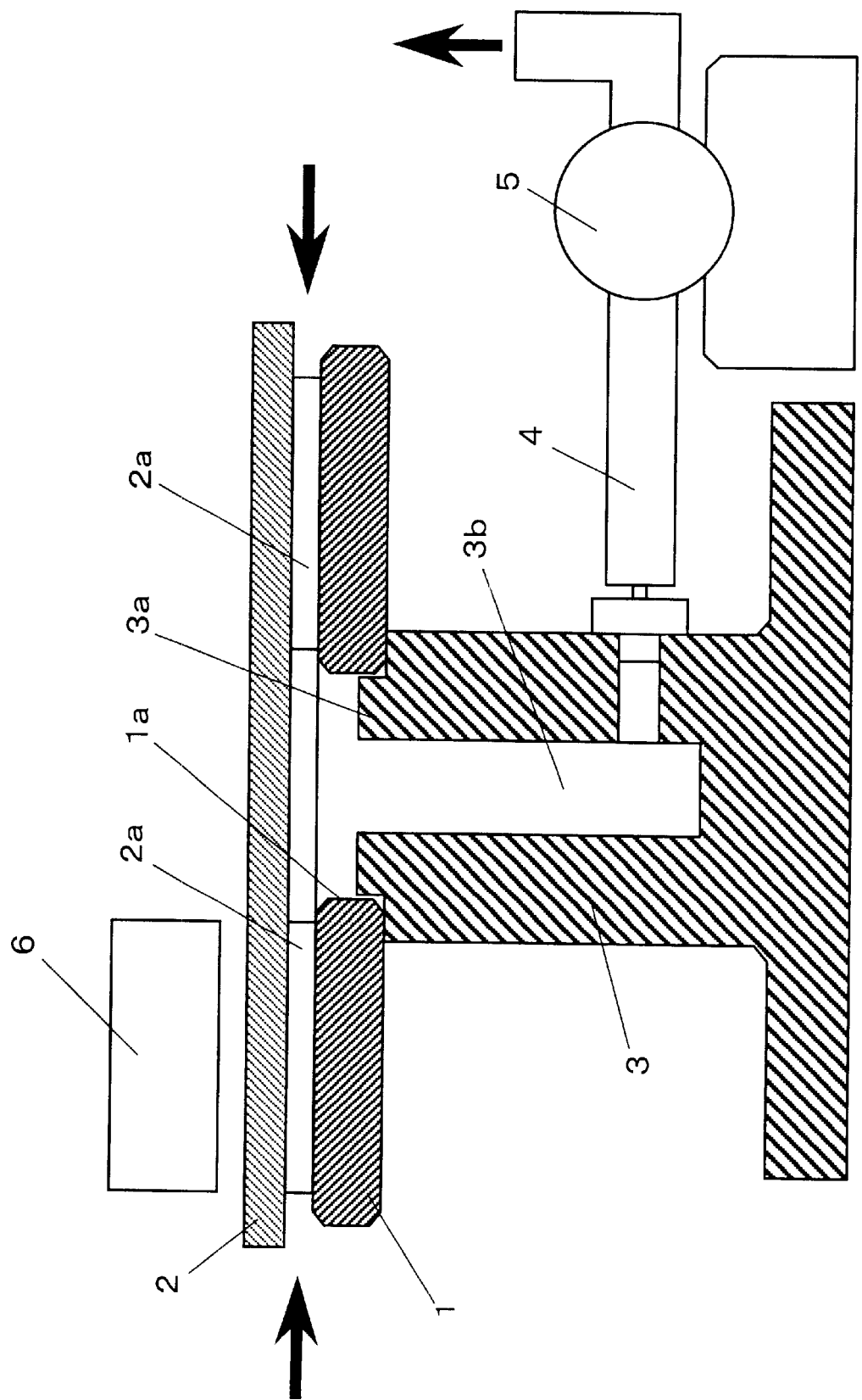
FIG. 1 is a schematic sectional view showing an example of a device used for implementing a method of recording magnetically on a magnetic recording medium according to a first embodiment of the present invention.

FIG. 1 shows a schematic view of a recording device used for implementing the recording method according to the present embodiment. In FIG. 1, numeral 1 denotes a disc-shaped hard disk as a disc-shaped magnetic recording medium. The hard disk 1 is produced by deposition of a ferromagnetic film made of Co or the like on a surface of a doughnut-disc-shaped aluminum substrate with a center hole 1a by sputtering. Numeral 2 is a disc-shaped master information carrier that is positioned to be superposed on a surface of a magnetic film made of a ferromagnetic film or the like of the hard disk 1 so as to be in contact with the surface of the magnetic film. This master information carrier 2 has a larger diameter than that of the hard disk 1 and a signal area 2a made of a ferromagnetic film on a surface in contact with the hard disk 1. The ferromagnetic film of the signal area 2a has a minute arranged pattern corresponding to information signals to be transferred magnetically into the hard disk 1.

Numeral 3 indicates a disk supporter for supporting the hard disk 1. This disk supporter 3 is provided with a chucking portion 3a for positioning and maintaining the hard disk 1 at its top. Inside the disk supporter 3, a suction hole 3b communicating with the center hole 1a of the hard disk 1 is provided, one end of which is connected to an exhaust duct 4. At an end of the exhaust duct 4, an exhauster 5 is attached. When this exhauster 5 starts operating, the air inside the space between the hard disk 1 and the master information carrier 2 is sucked through the exhaust duct 4 and the suction hole 3b, thus allowing the space to be in a negative pressure state. As a result, the master information carrier 2 is attracted in the direction toward the hard disk 1, and thus the hard disk 1 is superposed on the master information carrier 2 while being positioned with respect to the master information carrier 2. In this state, a slight gap is present between the hard disk 1 and the master information carrier 2 and the air is drawn in from the outside through the gap as indicated by arrows shown in FIG. 1.

Figure 2:
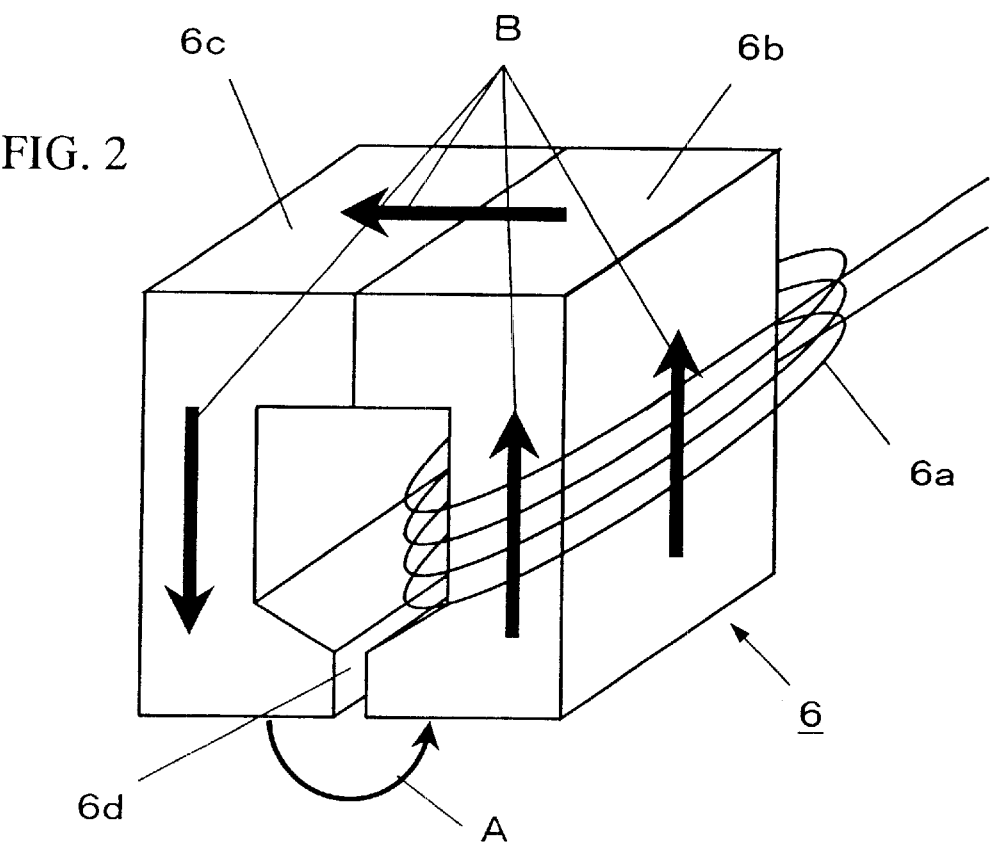
FIG. 2 is a schematic perspective view of a magnetizing head.

A magnetizing head 6 is used for transfer-recording signals from the master information carrier 2 into the hard disk 1. Using a magnetic field generated from a ferromagnetic film pattern corresponding to information signals, which has been formed in the master information carrier 2, the information signals are recorded into the hard disk 1 by a magnetic field generated by the magnetizing head 6. As shown in FIG. 2, the magnetizing head 6 includes opposed magnetic core halves 6c and 6b forming an annular magnetic circuit with a gap 6d. The magnetic core halves 6b and 6c are made of a ferromagnetic material, and the magnetic core half 6b is provided with a coil 6a. When an excitation current is applied to the coil 6a, leakage flux from the magnetic core half 6c to the magnetic core half 6b occurs in the vicinity of the gap 6d as indicated by an arrow A. By changing the direction of a current to be applied, the direction of the leakage flux occurring in the gap 6d can be changed. An arrow B indicates the direction of an internal magnetic flux occurring in the magnetic core halves 6b and 6c when the leakage flux in the direction shown in FIG. 2 occurs.

The shape of the gap 6d of the magnetizing head 6 is not shown in the figure, but the gap 6d has the same circular-arc shape as that of a tracking scan orbit of a magnetic head for recording and reproduction when viewed from the master information carrier 2 side. Therefore, the direction of the magnetic field generated in the gap 6d is always perpendicular to the tracking scan orbit. As a result, the ferromagnetic film of the master information carrier 2 is magnetized in the direction perpendicular to the direction of tracking scan by the magnetic head in every track. In other words, the ferromagnetic film is magnetized in the same direction as the direction corresponding to the gap length of the magnetic head.

Figure 3:
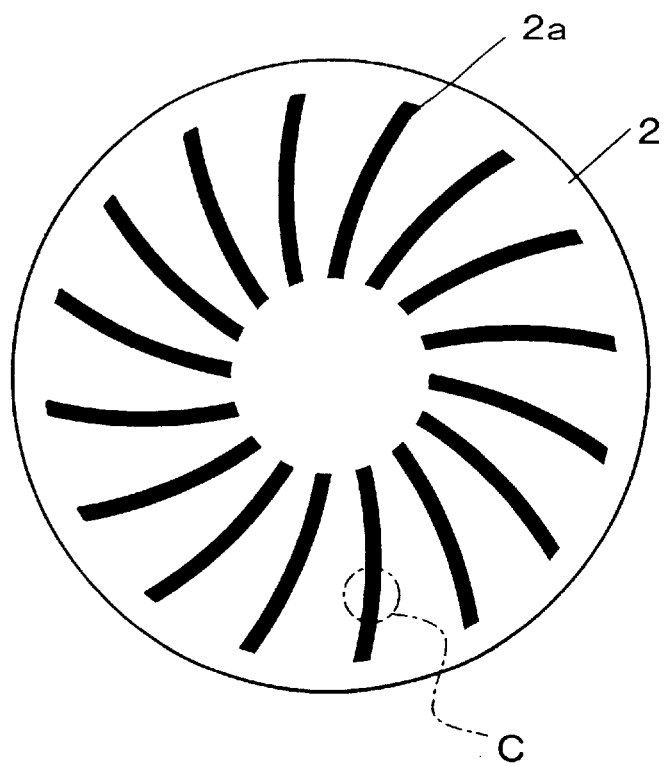
FIG. 3 is a plan view showing an example of a master information carrier used in the recording method of the present invention.

The following description is directed to an example of a master information carrier used in the recording method of the present invention. FIG. 3 shows a schematic plan view of an example of the master information carrier 2. On the surface of a principal plane of the master information carrier 2, i.e. the surface brought into contact with the ferromagnetic film of the hard disk 1, signal areas 2a are formed in a substantially radial form.

Figure 4:
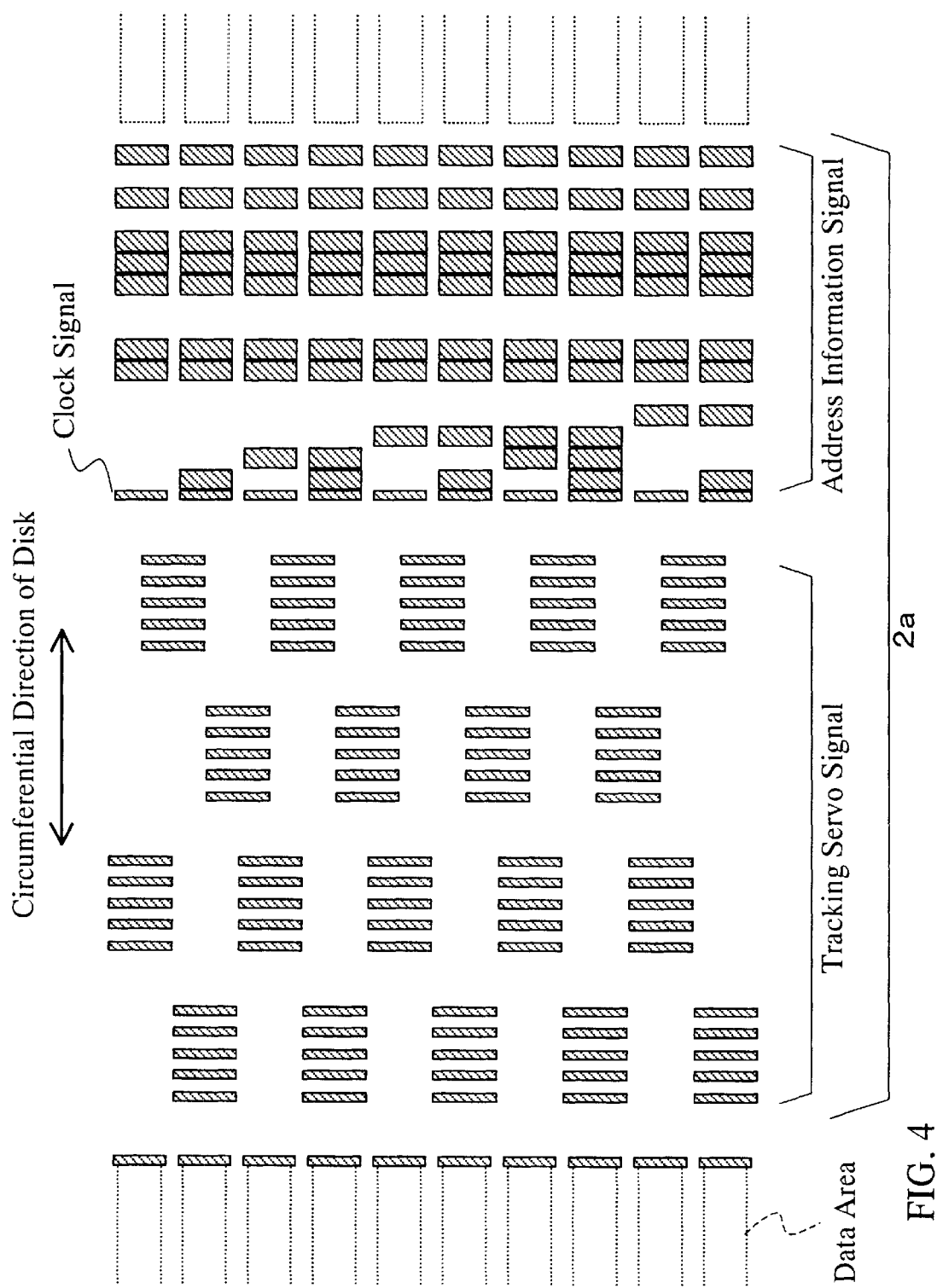
FIG. 4 is a plan view used for explaining an example of an arranged pattern of information signals to be formed in the master information carrier shown in FIG. 3.

FIG. 4 shows an enlarged schematic view of the area C circled with an alternating long and short dash line in a signal area 2a shown in FIG. 3. As shown in FIG. 4, in the signal area 2a, a master information pattern formed of magnetic portions of a ferromagnetic film is formed at positions corresponding to digital information signals, for example, preformat records, to be recorded in a magnetic recording medium, in a pattern corresponding to the information signals. In FIG. 4, hatched portions are magnetic portions composed of the ferromagnetic film. The master information pattern shown in FIG. 4 includes areas of clock signals, tracking servo signals, address information signals, and the like, which are arranged sequentially in a disk circumferential direction, i.e. in a track length direction. The master information pattern shown in FIG. 4 merely is an example and its configuration, positions, and the like can be determined suitably according to digital information signals to be recorded in the magnetic recording medium.

For instance, in a hard disk drive, when reference signals initially are recorded in a magnetic film of a hard disk and then preformat recording of tracking servo signals or the like is carried out based on the reference signals, only the reference signals to be used for the preformat recording are transfer-recorded into the magnetic film of the hard disk using the master information carrier. Then, the hard disk is inserted into a body of the drive, and the preformat recording of tracking servo signals or the like is carried out using a magnetic head of a hard disk drive. In this case, final preformat recording is carried out with a magnetic head mounted in the drive as in a conventional method. However, without using an expensive special servo recorder, the drive itself can complete the final preformat recording with reference to the reference signals that have been transfer-recorded. In the present method, therefore, as in the case where final preformat information signals are directly transfer-recorded, considerable cost benefits can be obtained as compared to that in the conventional method.

Figure 5:
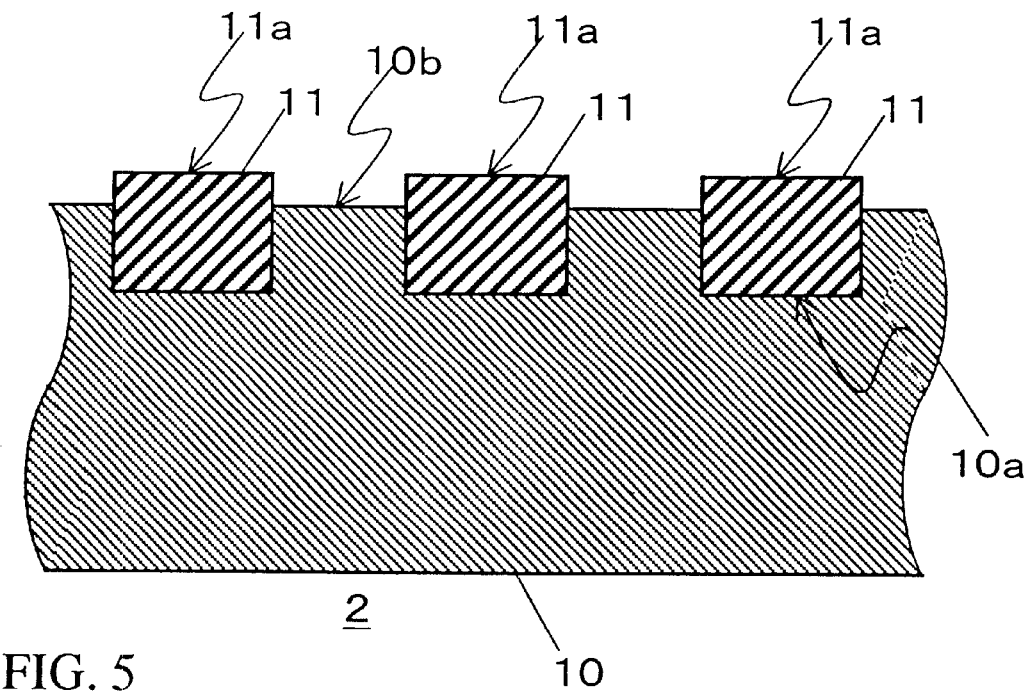
FIG. 5 is a sectional view showing an example of a master information carrier used in the recording method of the present invention.

FIG. 5 shows a partial sectional view of the area C shown in FIGS. 3 and 4. As shown in FIG. 5, the master information carrier 2 includes a disc-shaped substrate 10 made of a nonmagnetic material such as a Si substrate, a glass substrate, a plastic substrate, or the like. At a principal plane 10b of the substrate 10, i.e. the surface with which the surface of the hard disk 1 is brought into contact, recessed portions 10a are formed in a plurality of minute arranged pattern corresponding to information signals. In the recessed portions 10a, a ferromagnetic film 11 forming magnetic portions is embedded. In order to obtain excellent recording characteristics with the hard disk 1 and the master information carrier 2 being brought into uniform close contact using the recording device shown in FIG. 1, preferably the surface 11a of the ferromagnetic film 11 is as flat as possible and projects from the principal plane 10b of the substrate 10.

For the ferromagnetic film 11, many types of magnetic materials can be used irrespective of whether it is a hard-magnetic material, a semi-hard magnetic material, or a soft magnetic material. In short, any material can be used as long as it allows digital information signals to be transfer-recorded into a magnetic recording medium. For instance, Fe, Co, a Fe—Co alloy, or the like can be used. In order to generate a sufficient recording magnetic field irrespective of the type of the magnetic recording medium into which master information is recorded, it is preferable that the magnetic material has a higher saturation magnetic flux density. Particularly, with respect to a magnetic disk with a high coercive force exceeding 2000 oersted (159 kA/m) or a flexible disk with a very thick magnetic layer, proper recording may not be performed in some cases when the saturation magnetic flux density is 0.8 tesla or lower. Generally, therefore, magnetic materials with a saturation magnetic flux density of at least 0.8 tesla, preferably at least 1.0 tesla, are used.

The thickness of the ferromagnetic film 11 depends on a bit length, saturation magnetization in the magnetic recording medium, and thickness of the magnetic layer, but may be about 50 nm to 500 nm when, for example, the bit length is about 1 μm, the saturation magnetization and the thickness of a magnetic layer of the magnetic recording medium are about 500 emu/cc (500 kA/m) and about 20 nm, respectively.

In order to obtain an excellent recording signal quality in such a recording method, preferably, the arranged pattern of the ferromagnetic film 11 provided in the master information carrier is excited to be magnetized uniformly in preformat recording. Furthermore, it is desirable that prior to the signal recording using the master information carrier, the magnetic recording medium such as a hard disk is subjected to uniform direct current erasing.

Next, the following description is directed to a procedure for recording information signals, which correspond to a pattern formed in the master information carrier, into a hard disk as a disc-shaped magnetic recording medium.

Figure 6:
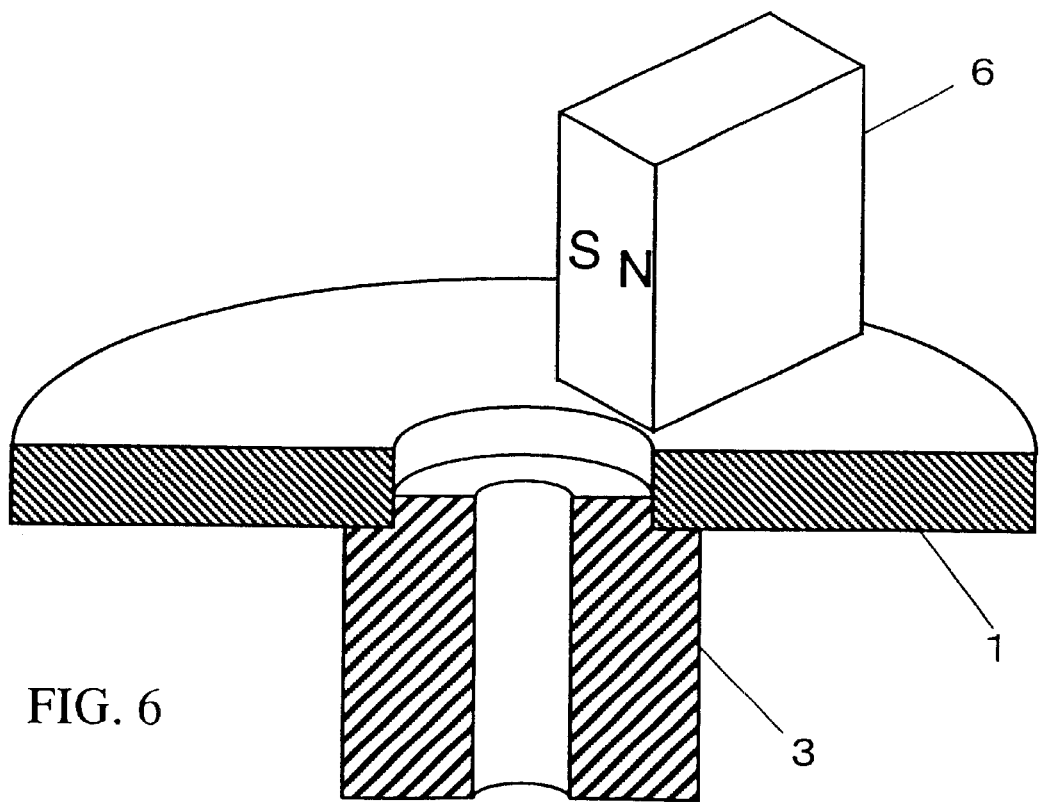
FIG. 6 is a perspective view showing a state where one-direction magnetic field is applied to a hard disk in the recording method of the present invention.
Figure 7:
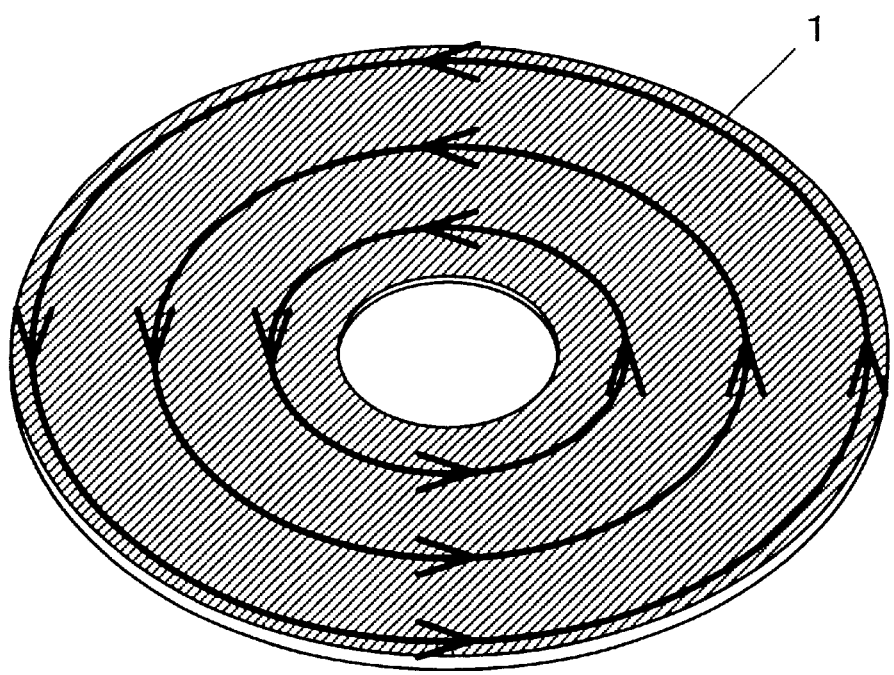
FIG. 7 is a schematic perspective view showing a state of the hard disk magnetized in one direction in the process shown in FIG. 6.

As shown in FIG. 6, a magnetizing head 6 is rotated in parallel to the hard disk 1 about the center axis of the hard disk 1 as the rotation axis while being positioned close to the hard disk 1. Thus, the hard disk 1 is pre-magnetized in one direction as indicated by arrows shown in FIG. 7 (initial magnetization).

Next, as shown in FIG. 1, the exhauster 5 is started while the master information carrier 2 is positioned and superposed on the hard disk 1. Thereby, the master information carrier 2 is attracted through the center hole 1a of the hard disk 1, thus allowing a uniform contact between the hard disk 1 and the surface with the ferromagnetic film 11 of the master information carrier 2.

Figure 8:
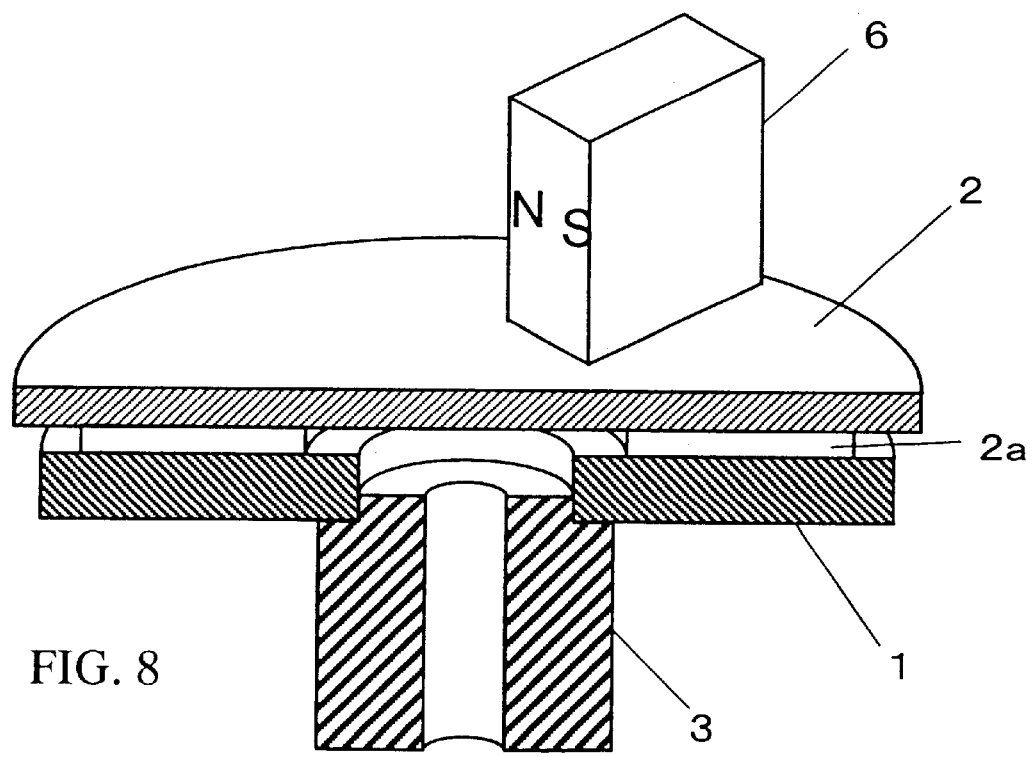
FIG. 8 is a perspective view showing a state where information signals are transfer-recorded into the hard disk by the recording method of the present invention.
Figure 9:
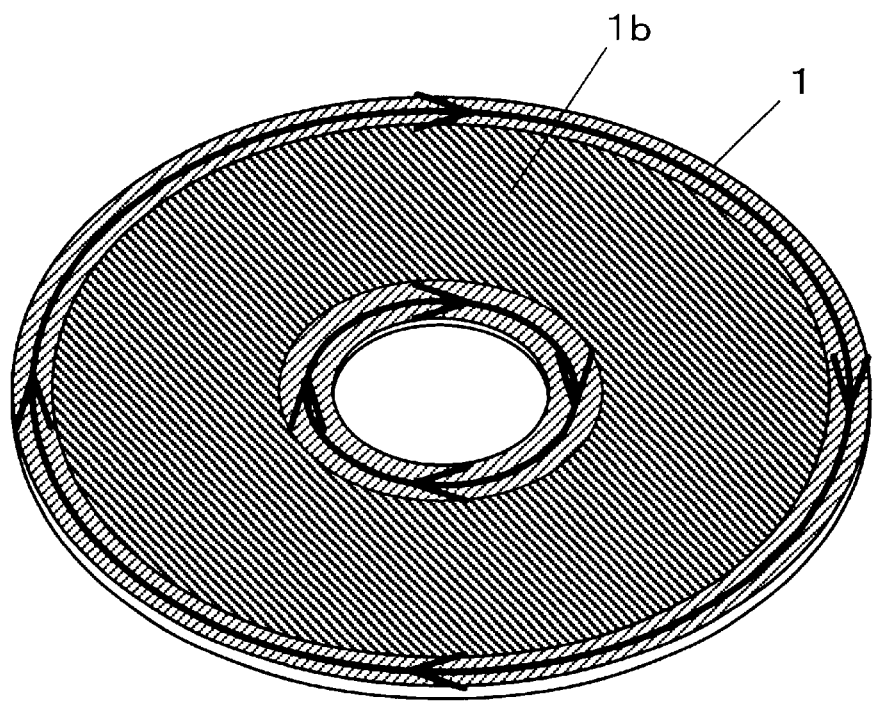
FIG. 9 is a schematic perspective view showing a state of the hard disk in which the information signals are recorded in the process shown in FIG. 8.

After that, as shown in FIG. 8, the magnetizing head 6 is set so that it generates a magnetic field in the opposite direction to that of the magnetic field generated by the initial magnetization. In this state, while the magnetizing head 6 is rotated in parallel to the master information carrier 2 about the center of the hard disk supported by the disk supporter 3 as a rotation center, a dc excitation magnetic field is applied to the master information carrier 2. By this, the ferromagnetic film 11 of the master information carrier 2 is magnetized. Thus, information signals corresponding to the pattern of magnetic portions composed of the ferromagnetic film 11 are recorded in the predetermined area 1b of the hard disk 1 on which the master information carrier 2 has been superposed, as shown in FIG. 9. In this connection, the arrows shown in FIG. 9 indicate the direction of magnetization remaining outside 1b of the hard disk 1 after the information signals are recorded.

Figure 10:
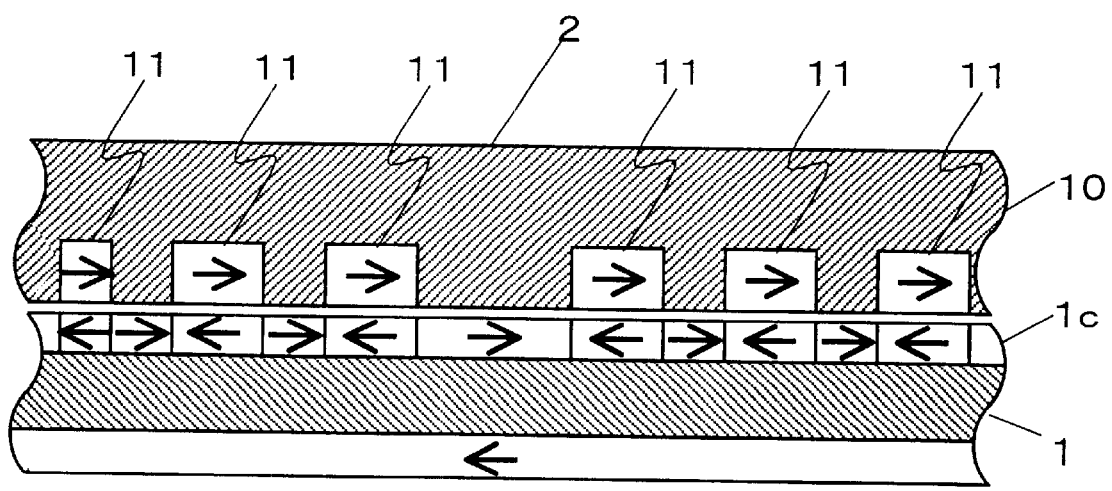
FIG. 10 is a schematic sectional view used for explaining a state of a magnetized pattern when the information signals are transfer-recorded in the hard disk in the process shown in FIG. 8.

FIG. 10 shows the state during the above-mentioned magnetization process. As shown in FIG. 10, while the master information carrier 2 is in close contact with the hard disk 1, a magnetic field is applied to the master information carrier 2 from the outside to magnetize the ferromagnetic film 11, thus recording information signals in the magnetic recording layer 1c composed of the ferromagnetic film of the hard disk 1. In other words, by using the master information carrier 2 with the ferromagnetic film 11 formed in a predetermined pattern on the non-magnetic substrate 10, digital information signals can be magnetically transfer-recorded into the hard disk 1 of a magnetic recording medium.

Figure 11A:
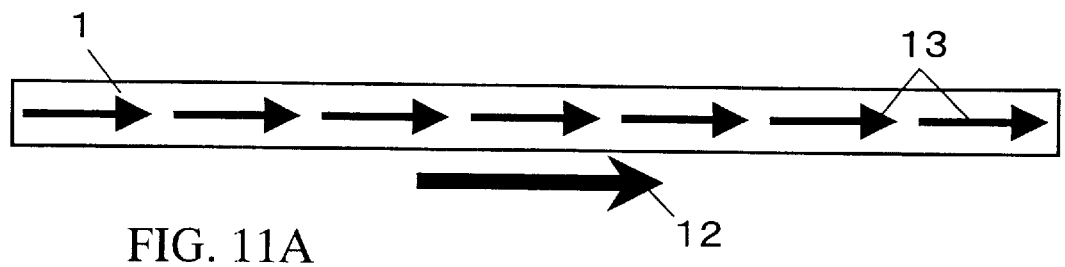
FIGS. 11A, 11B, and 11C show schematic views illustrating preferable recorded states in preformat recording by the recording method of the present invention.
Figure 11B:
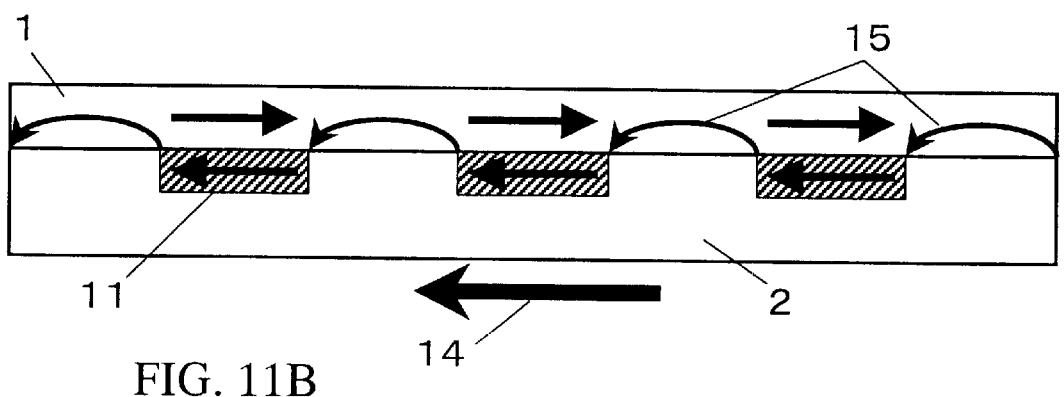
Figure 11C:
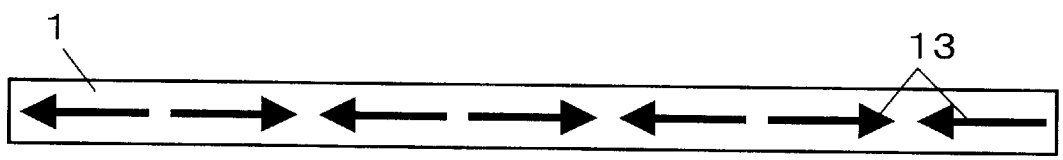

The transfer-recording method is described further in detail as follows. FIGS. 11A, 11B, and 11C show the procedure of the above-mentioned preformat recording by way of sectional views in a direction of the information signal track length. FIG. 11A shows a direct current erasing process with respect to the hard disk 1 of the magnetic recording medium. FIG. 11B shows a signal recording process using the master information carrier 2. FIG. 11C shows a residual magnetization state of the hard disk 1 after the preformat recording. When this magnetic recording medium is the hard disk 1, the direction of the information signal track length coincides with the disk circumferential direction.

As shown in FIG. 11A, the hard disk 1 of a magnetic recording medium is subjected to the uniform direct current erasing through the magnetization 13 in one direction by a magnetic field 12 for the direct current erasing prior to the transfer-recording of signals using the master information carrier. After that, as shown in FIG. 11B, the surface of the master information carrier 2 in which the ferromagnetic film 11 is formed in an arranged pattern corresponding to information signals is brought into close contact with the surface of the hard disk 1, and then the ferromagnetic film 11 is excited by a magnetic field 14 for direct current excitation. In this case, the magnetic field 14 has an opposite polarity to that of the magnetic field 12. According to this, the magnetization 13 in the hard disk 1 is reversed by leakage flux 15 only in the portions between the respective portions of a ferromagnetic film 11. As a result, after the master information carrier 2 is removed, a pattern of the magnetization 13 corresponding to the arranged pattern of the ferromagnetic film 11 formed in the master information carrier 2 can be recorded in the hard disk 1.

As described above, in the method of transfer-recording from the master information carrier into a magnetic recording medium according to the present invention, magnetic portions composed of a ferromagnetic film are preformed on the master information carrier in an arranged pattern corresponding to predetermined digital information signals to be recorded in the magnetic recording medium, the magnetic recording medium is brought into contact with the master information carrier, and the arranged pattern formed in the master information carrier is transfer-recorded into the magnetic recording medium as a magnetized pattern. In such a method, it is important to reliably and correctly transfer the arranged pattern of the magnetic portions formed in the master information carrier as a corresponding magnetized pattern.

Figure 12:
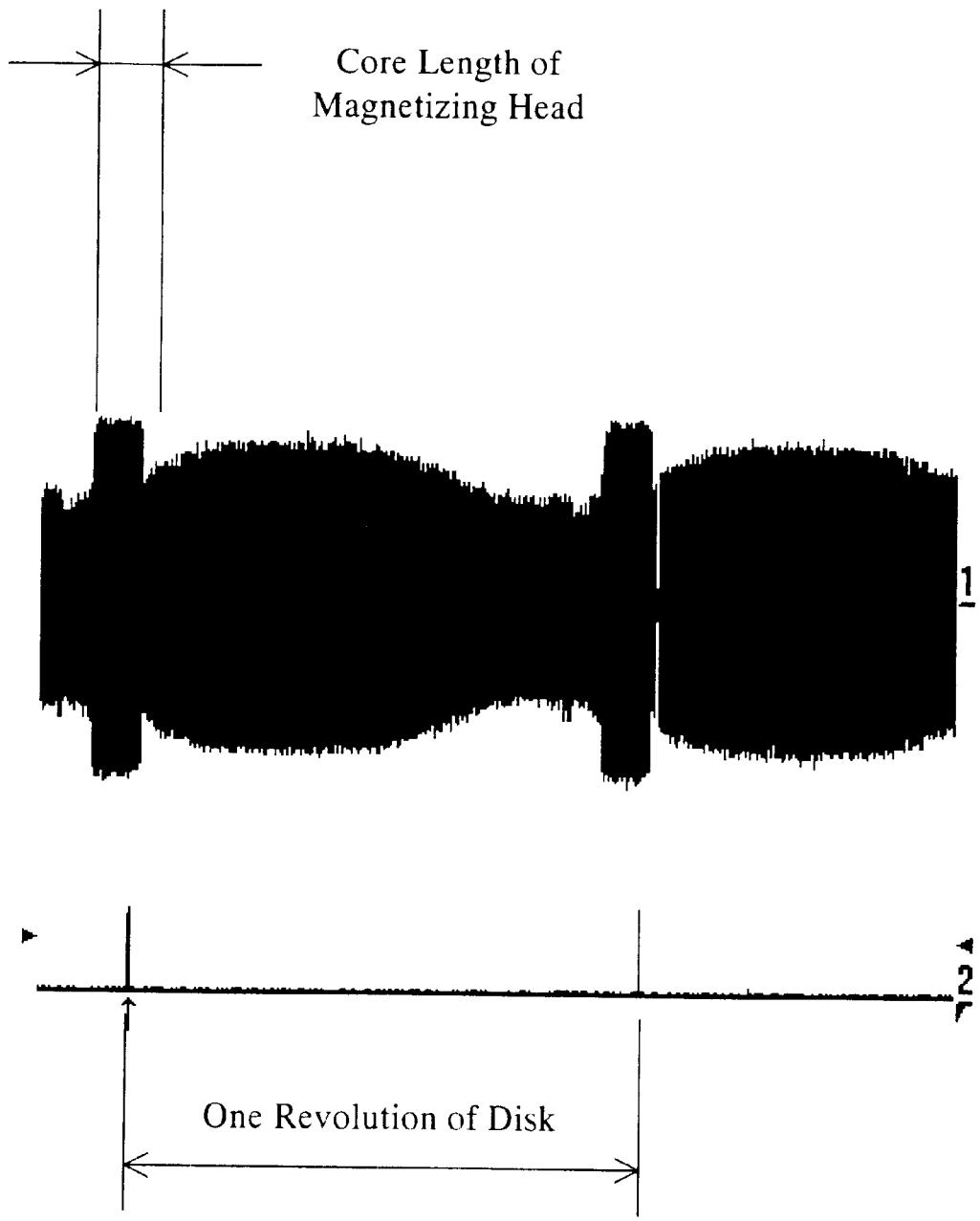
FIG. 12 is a diagram showing reproduced signals of information signals transfer-recorded by a conventional recording method.

However, when the present inventors conducted preformat recording on a magnetic recording medium such as a hard disk using a magnetizing head, they found unidentifiable phenomena, depending on various conditions in the preformat recording, of deterioration in quality of reproduced signals or unstable variation depending on the position on the magnetic recording medium. FIG. 12 shows an example of the reproduced signals of preformat signals recorded in the hard disk as an example of the considerable deterioration in signal quality.

FIG. 12 is an example of reproduced signals reproduced using a magnetoresistive head after periodic signals whose polarity is inverted at a predetermined interval are recorded for one revolution of a magnetic disk. Although the periodic signals were recorded with a uniform condition, the amplitude of the reproduced signals varies considerably depending on the positions in the disk circumferential direction. When such deterioration in the quality of reproduced signals is caused, a magnetic recording/reproducing device cannot operate servo tracking using the preformat recording signals.

In some cases, such a phenomenon of the deterioration in signal quality may be prevented to some degree by experimental optimization of various conditions in the preformat recording. However, when magnetic recording/reproducing devices are mass-produced using the preformat recording technique as described above, appropriate conditions for the preformat recording are required to have a great tolerance to some degree in view of product quality assurance and improvement in production yield. In proper recording conditions derived by a trial-and-error experimental method using the preformat recording according to the state of the art, an acceptable proper range is very narrow in view of the signal quality. Therefore, in view of the product quality assurance and the improvement in production yield in mass production, the current preformat recording is difficult to consider as being sufficiently practical.

In order to solve this problem, the present inventors repeated various experiments and studies and as a result, found that such a type of phenomenon of deterioration in signal quality as illustrated in FIG. 12 is caused by the following effects.

Figure 13A:
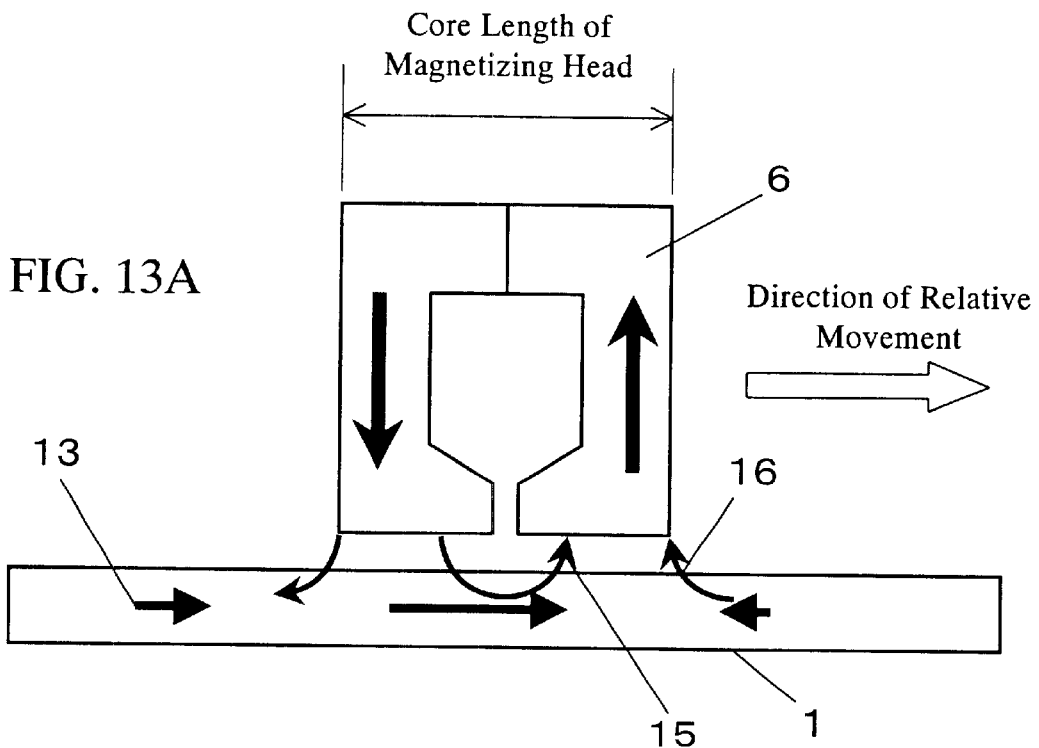
FIGS. 13A and 13B show schematic views illustrating a direct current erasing process according to the conventional recording method.

For example, when a magnetizing head with a configuration such as shown in FIG. 2 is used, as shown in FIG. 13A, besides the leakage flux 15 from the gap primarily contributing to the direct current erasing, leakage flux 16 leaking from an edge of a magnetic core of the magnetizing head 6 contributes to the magnetization process with respect to a magnetic recording medium. In FIG. 13A, arrows inside the magnetizing head 6 indicate directions of internal flux. The leakage flux 16 leaking from the edge of the magnetic core has an opposite polarity to that of the leakage flux 15 from the gap primarily contributing to the direct current erasing. Therefore, the leakage flux 16 demagnetizes the portions that have been subjected to the direct current saturation erasing by the leakage flux 15 from the gap. Consequently, the magnetization 13 after the direct current erasing is in the state shown in FIG. 13B.

Figure 14A:
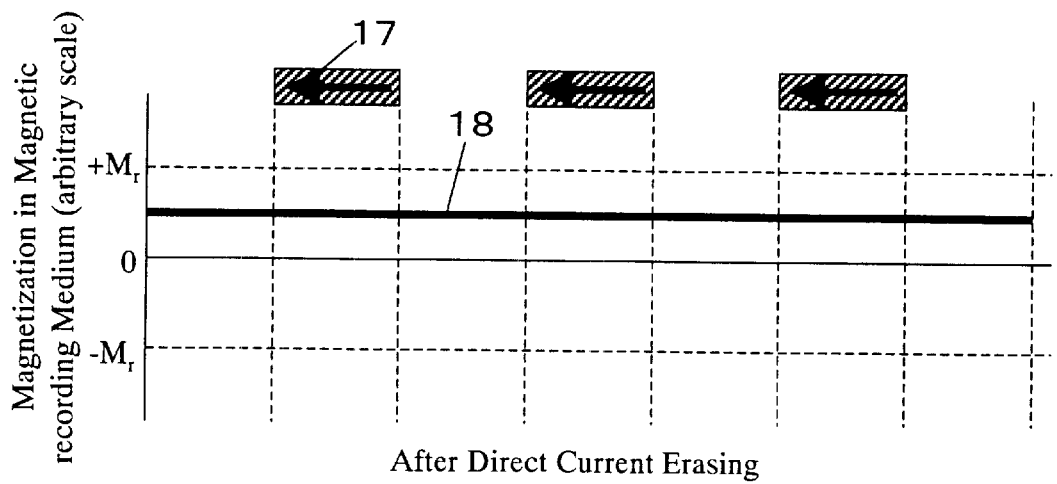
FIGS. 14A and 14B show magnetization distributions in a magnetic recording medium after the direct current erasing and after the signal transfer-recording by the conventional recording method, respectively.
Figure 14B:
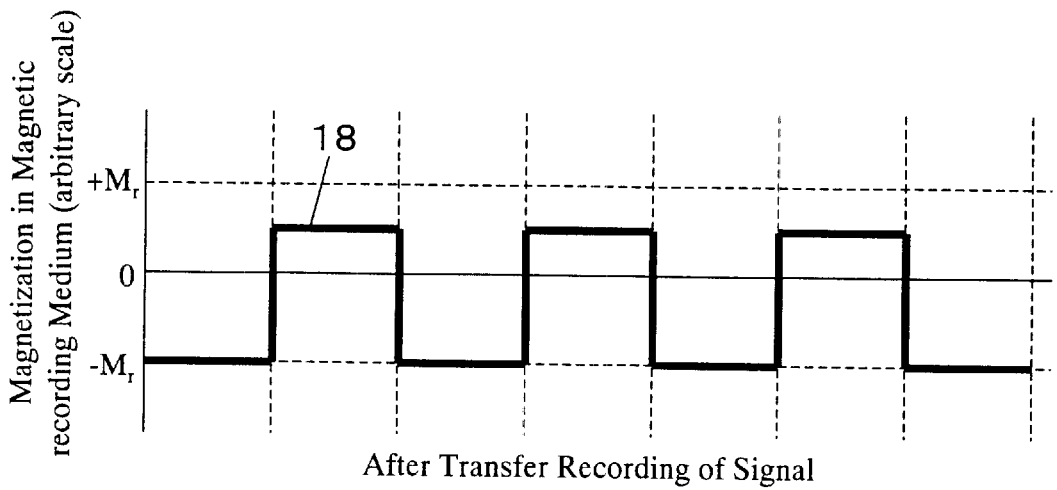

In other words, as shown in FIG. 14A, magnetization 18 in the magnetic recording medium after the direct current erasing is smaller than the residual magnetization $M_r$ in the magnetic recording medium by far, thus achieving no direct current saturation erasing. In this case, even when the magnetization 18 in the magnetic recording medium is inverted to a residual magnetization $-M_r$ with a reversed polarity in the portions between the respective portions of a ferromagnetic film 17a, as shown in FIG. 14B, by signal transfer-recording using a master information carrier, magnetization recorded in the magnetic recording medium is weak in the portions corresponding to the portions of the ferromagnetic film 17, thus causing the reduction in the amplitude of reproduced signals as illustrated in FIG. 12.

Figure 13B:
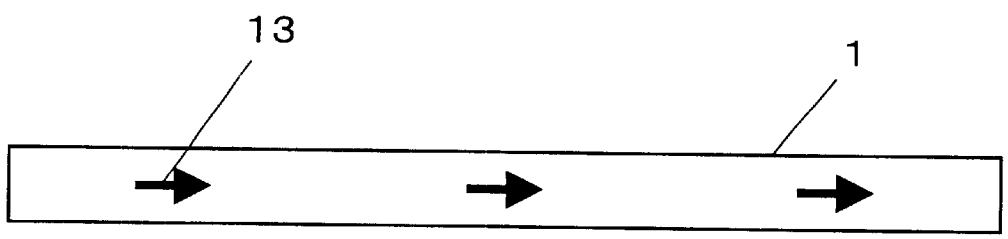

In the direct current erasing process shown in FIGS. 13A and 13B, directly under the core of the magnetizing head positioned at a location where the magnetic head 6 is eventually moved away from the magnetic recording medium surface after being moved relatively thereto, the magnetic recording medium is not affected by the magnetic flux with a reversed polarity leaking from the edge of the magnetic core. Consequently, the magnetization in the magnetic recording medium in the above-mentioned location is substantially equal to the residual magnetization $M_r$. Therefore, in the reproduced signals shown in FIG. 12, only at the above-mentioned portion directly under the core of the magnetizing head, a high output amplitude can be obtained in the area with a width substantially equal to the magnetizing head core length. It is conceivable that the variation in reproduced signal amplitude in an area other than the above-mentioned area is caused by a variation in spacing between the magnetic recording medium and the magnetizing head when the magnetizing head is moved relatively with respect to the magnetic recording medium.

Based on the finding of the phenomenon that leakage from the portion other than the gap of the magnetizing head causes the deterioration in quality of the transfer-recorded signals as described above, the present invention is designed so that a magnetic field applied to an object to be magnetized by magnetic flux leaking from the portion other than the gap of the magnetizing head is suppressed to be 20% or less of a magnetic field applied to the object to be magnetized by the magnetic flux leaking from the gap of the magnetizing head. Thus, an influence of leakage flux with a reversed polarity that primarily does not contribute to the magnetic fields for the direct current erasing and the direct current excitation is suppressed to be within an acceptable range, thus preventing the deterioration in the signal quality. In the above, the "object to be magnetized" denotes a magnetic recording medium in the direct current erasing process and the ferromagnetic film in the master information carrier in the process of transfer-recording signals.

Naturally, it is desirable that the magnetic field applied to the object to be magnetized by the magnetic flux leaking from the portion other than the gap of the magnetizing head is as close to zero as possible. On the other hand, according to experiments and studies based thereon by the present inventors, when the magnetic field applied to the object to be magnetized by the magnetic flux leaking from the portion other than the gap of the magnetizing head did not exceed 20%, a practically satisfactory result was obtained. When it exceeded 20%, as described with reference to FIG. 12, the variation in reproduced signal amplitude increased depending on the positions in the disk circumferential direction to cause the deterioration in quality of the reproduced signals, which made it difficult to carry out the servo tracking even when a correction was made using an electronic circuit.

In view of the above, in the present invention, the magnetic field applied to the object to be magnetized by the magnetic flux leaking from the portion other than the gap of the magnetizing head is set to be 20% or less of the magnetic field applied to the object to be magnetized by the magnetic flux leaking from the gap.

Furthermore, the present inventors found that the leakage flux with a reversed polarity that primarily did not contribute to the magnetic fields for the direct current erasing and the direct current excitation occurred due to the localized magnetic saturation in a magnetizing head caused by its shape. In other words, in the recording method of the present invention, the use of a magnetizing head with a specific configuration and shape allows the magnetic field applied to the object to be magnetized by the magnetic flux leaking from the portion other than the gap of the magnetizing head to be suppressed to be 20% or less of the magnetic field applied to the object to be magnetized by the magnetic flux leaking from the gap.

The following description is directed to configurations of magnetizing heads used in the recording method of the present invention, i.e. magnetizing heads that allow the magnetic field applied to the object to be magnetized by the magnetic flux leaking from the portion other than the gap of the magnetizing head to be suppressed to be 20% or less of the magnetic field applied to the object to be magnetized by the magnetic flux leaking from the gap.

Second Embodiment

Figure 15:
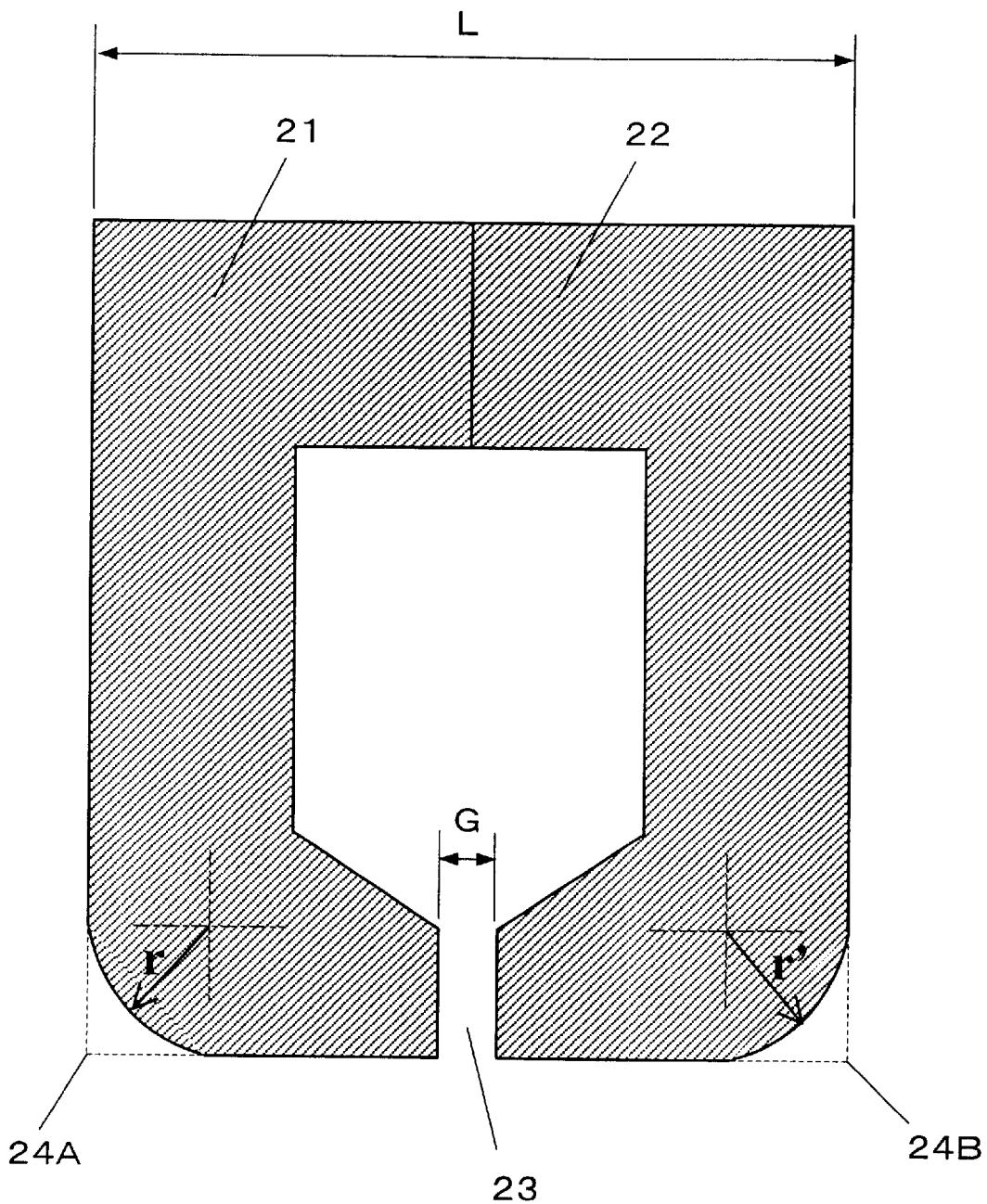
FIG. 15 is a sectional view showing an example of a magnetizing head used in a second embodiment of the present invention.

A magnetizing head according to a second embodiment shown in FIG. 15 is a first example of the magnetizing head used in the recording method of the present invention. FIG. 15 shows a cross-section parallel to an annular magnetic path of a magnetic circuit of a magnetizing head, i.e. a cross-section in a track-length direction of information signals in a circumferential direction of, for example, a disc-shaped magnetic recording medium. This magnetizing head includes opposed first and second magnetic core halves 21 and 22 with yoke shapes forming an annular magnetic circuit with a gap 23. Its outer periphery in the cross-section parallel to the annular magnetic path of the magnetic circuit is formed to have a substantially polygonal shape in which at least vertexes adjacent to the gap 23 have a curved shape. Specifically, the outer periphery may have a shape in which at least vertexes adjacent to the gap 23, i.e. vertexes 24A, 24B shown in the figure, are formed to have curved shapes with curvatures of radii r and r' of at least 0.5 mm. In FIG. 15, the outer periphery has a substantially rectangular shape, but the shape is not limited to this. The outer periphery can have another polygonal shape such as a pentagonal or hexagonal shape as required.

In a magnetizing head with the configuration as illustrated in FIG. 2, vertexes adjacent to the gap in the outer peripheral shape of a cross-section parallel to the annular magnetic path of the magnetic circuit reach magnetic saturation locally, resulting in the deterioration in signal quality due to the influence of the leakage flux leaking from the vertexes. On the other hand, in the configuration shown in FIG. 15, the vertexes 24A and 24B adjacent to the gap are processed to have a curved shape with a curvature of a radius of at least 0.5 mm to provide a shape effect, thus suppressing the magnetic saturation at the vertexes 24A and 24B. Consequently, it is possible to suppress the occurrence of leakage flux from the vertexes 24A and 24B.

FIGS. 16A and 16B show a direct current erasing process when using the magnetizing head according to the present embodiment. A magnetizing head 25 shown in FIG. 16A has a configuration as described above according to the present embodiment. In the direct current erasing process illustrated in FIGS. 16A and 16B, there hardly occurs leakage flux leaking from the edges of the magnetic core included in the magnetizing head 25 as shown in FIG. 16A. Therefore, leakage flux other than leakage flux 26 leaking from the gap primarily contributing to the direct current erasing makes no contribution to a process of magnetization of a hard disk 1 as a magnetic recording medium. As a result, in the hard disk 1, magnetization 27 is formed as shown in FIG. 16B.

Figure 17A:
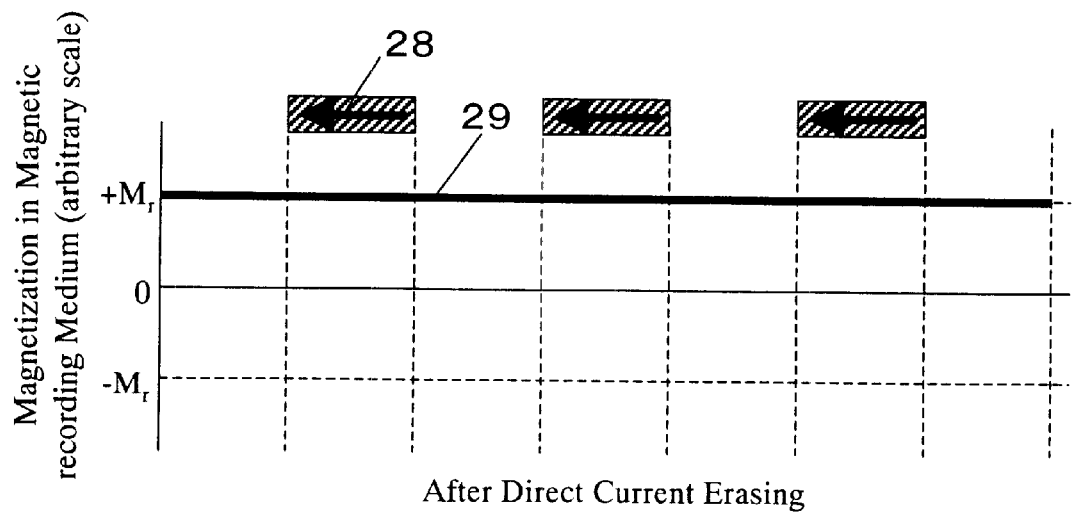
FIGS. 17A and 17B show magnetization distributions in a magnetic recording medium after the direct current erasing and after the signal transfer-recording using the magnetizing head shown in FIG. 15, respectively.
Figure 17B:
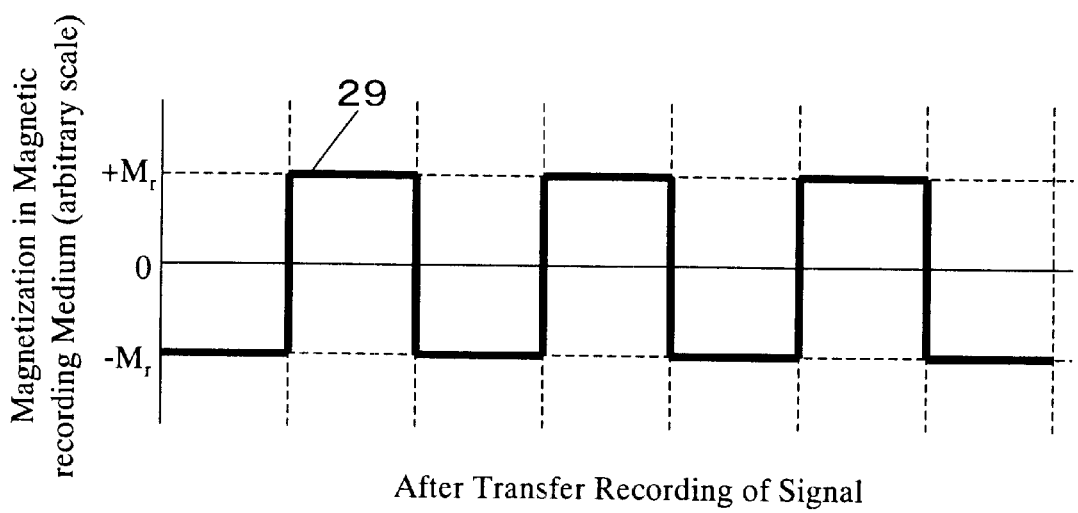

Consequently, as shown in FIG. 17A, magnetization 29 in the magnetic recording medium after the direct current erasing reaches residual magnetization $M_r$ uniformly irrespective of the positions, thus achieving direct current saturation erasing. After the direct current erasing, by a signal transfer-recording using a master information carrier, in portions between respective portions of a ferromagnetic film 28, the magnetization 29 in the magnetic recording medium shown in FIG. 17A is inverted to be residual magnetization $-M_r$ with a reversed polarity as shown in FIG. 17B, thus achieving the saturation recording of a magnetized pattern in the magnetic recording medium corresponding to a ferromagnetic film pattern formed in the master information carrier.

Figure 18:
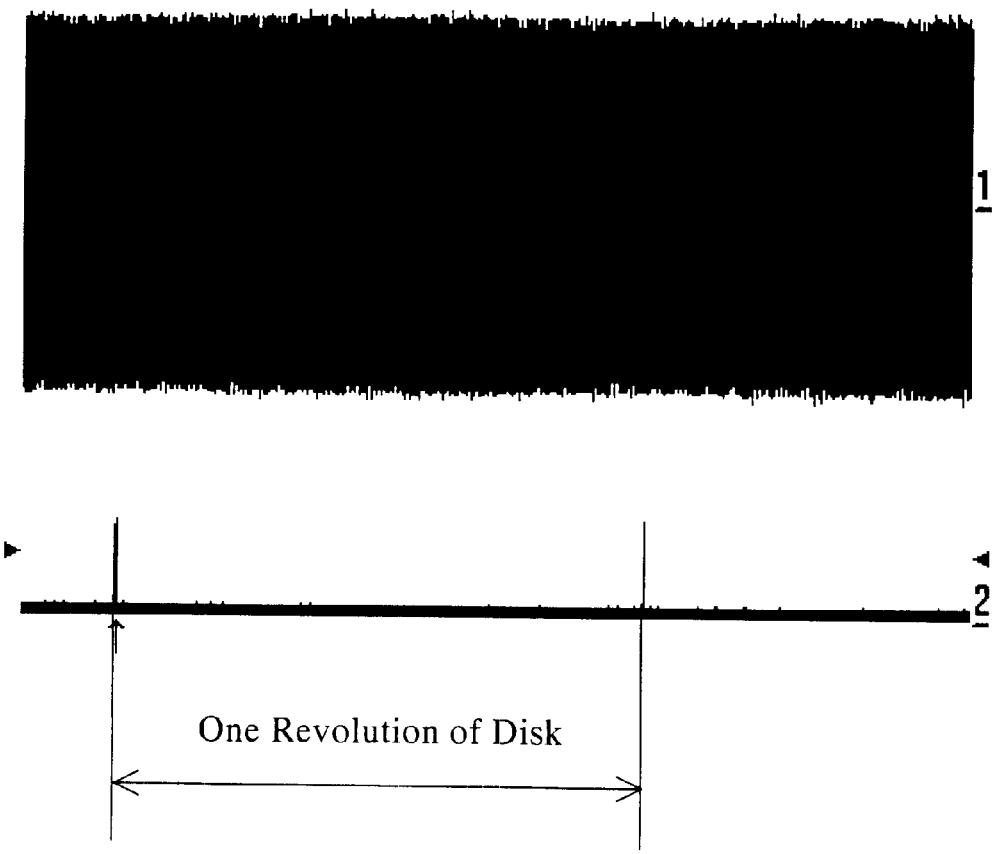
FIG. 18 is a diagram showing reproduced signals of information signals transfer-recorded using the magnetizing head shown in FIG. 15.

FIG. 18 shows an example of reproduction signals obtained when using a magnetizing head with the configuration of the present embodiment, in which periodic signals whose polarity was inverted at a certain interval were transfer-recorded into a hard disk for one revolution and then were reproduced using a magnetoresistive head. The signals were different from the reproduced signals of the conventional example shown in FIG. 12 and high quality reproduced signals with a larger amplitude and a smaller variation in amplitude depending on the position were obtained stably.

In FIG. 15, the radii r and r' were illustrated to be the same, but it is not always necessary for the both to be the same. However, when even one of the radii r and r' is below 0.5 mm, the magnetic saturation at the vertexes 24A and 24B cannot be suppressed sufficiently. Therefore, in the direct current erasing process and the signal transfer-recording process, it is difficult to suppress the magnetic field applied to the object to be magnetized by the magnetic flux leaking from the portion other than the gap to be 20% or less of the magnetic field applied to the object to be magnetized by the magnetic flux leaking from the gap. Consequently, such high quality reproduced signals as shown in FIG. 18 might not be obtained in some cases.

On the other hand, when the radii r and r' are too large, the cross-sectional areas of the magnetic path in the vicinities of the vertexes 24A and 24B become small locally, and as a result, conversely the magnetic saturation in those portions may be increased. Therefore, when the radii r and r' are increased to be several millimeters or more, it is necessary to increase sufficiently the cross-sectional areas of the magnetic paths in the vertexes 24A and 24B of the first and second magnetic core halves 21 and 22 depending on the radii. In the present embodiment, the radii r and r' were set to be 2 mm, so that an effect of the present invention was obtained sufficiently. As a result, high quality reproduced signals as shown in FIG. 18 were obtained stably.

FIG. 15 shows an example in which the whole magnetic core is formed of a permanent magnet material. A first magnetic core half 21 and a second magnetic core half 22 are magnetized uniformly in a direction along an annular magnetic path of a magnetic circuit formed of the first and second magnetic core halves 21 and 22. Preferably, the first and second magnetic core halves 21 and 22 have a residual magnetic flux density of at least 1.0 tesla and a coercive force of at least 10000 oersted (796 kA/m). As a permanent magnet having such characteristics, a rare-earth magnet containing a material of Nd—Fe—B, Sm—Co, or the like as a main component can be used.

Furthermore, the outer dimension of the magnetizing head can be varied according to the shape of a magnetic recording medium subjected to preformat recording. In one example of the present invention, the core length (indicated as L in FIG. 15) and the gap length (indicated as G in FIG. 15) of the magnetizing head are set to be about 5 mm to 30 mm and about 0.5 mm to 3 mm, respectively. The direction of a core width (a width in a direction normal to the paper showing FIG. 15) in the magnetizing head coincides with a track width direction of information signals to be transfer-recorded. Therefore, the increase in the core width allows recording to be carried out for an increased number of tracks at a time. For example, when preformat recording is performed on a hard disk with an outer diameter of 3.5 inches, a signal recording area in the radial direction of the hard disk is positioned between the diameters of about 21 mm and 46 mm. Therefore, as an example, a core width in the magnetizing head is set to be about 25 mm to 30 mm so as to substantially cover the whole area. The magnetizing heads described later in the third to seventh embodiments may have the same outer dimension as in the above.

Third Embodiment

Figure 19:
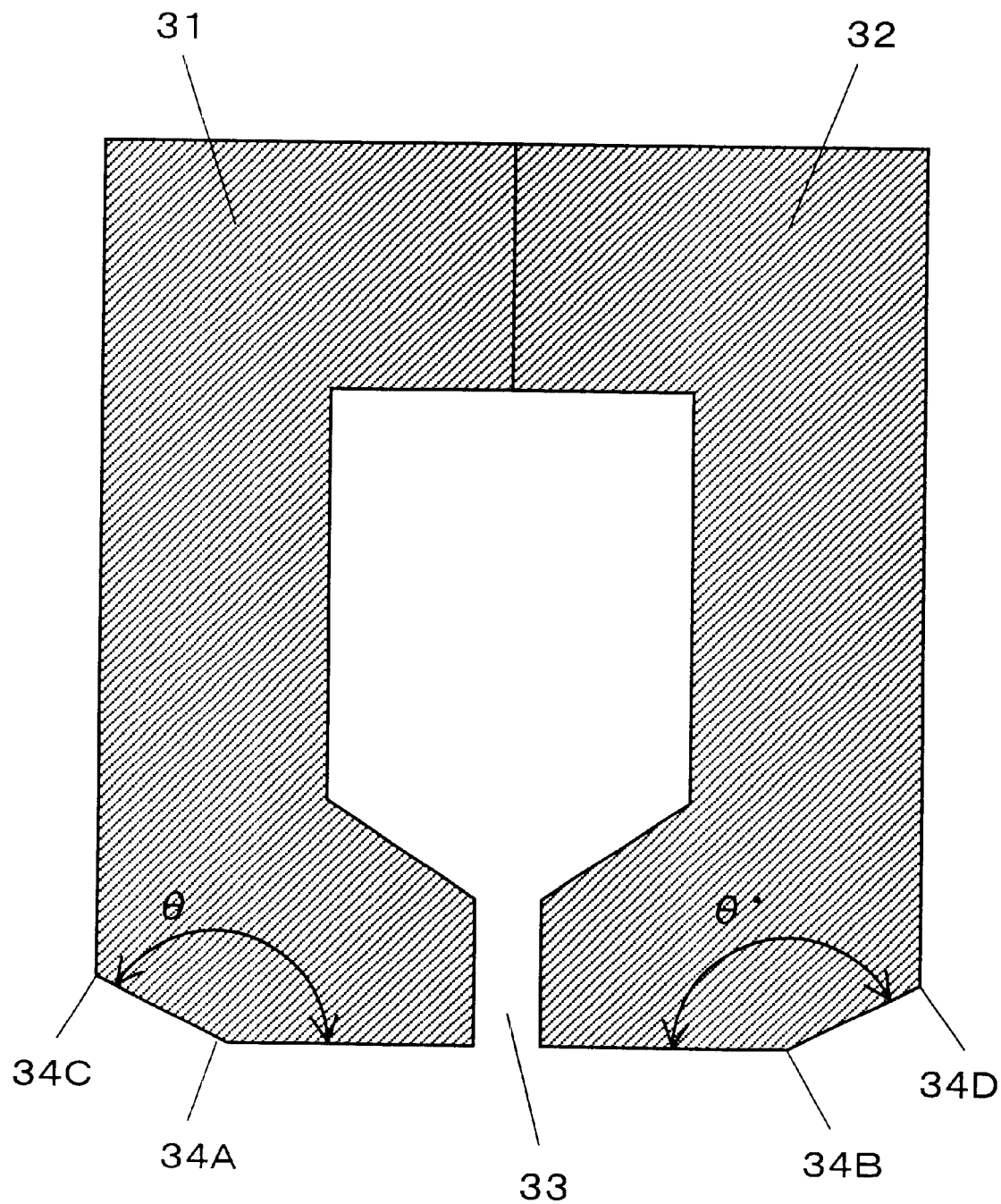
FIG. 19 is a sectional view showing an example of a magnetizing head used in a third embodiment of the present invention.

A magnetizing head according to a third embodiment shown in FIG. 19 is a second example of the magnetizing head used in the recording method of the present invention. FIG. 19 shows a cross-section parallel to an annular magnetic path of a magnetic circuit, i.e. a cross-section in a track-length direction of information signals, for example, in a circumferential direction of a disc-shaped magnetic recording medium. This magnetizing head includes opposed first and second magnetic core halves 31 and 32 with yoke shapes forming an annular magnetic circuit with a gap 33. Its outer periphery in the cross-section parallel to the annular magnetic path of the magnetic circuit is formed to have a substantially polygonal shape in which at least vertexes adjacent to the gap 33 have an interior angle of at least 100 degrees. In other words, as shown in FIG. 19, the outer periphery in the cross-section parallel to the annular magnetic path of the magnetic circuit is formed to have a substantially polygonal shape in which at least vertexes 34A and 34B adjacent to the gap 33 have interior angles θ and θ' of at least 100 degrees. In FIG. 19, the outer periphery has a substantially hexagonal shape, but the present embodiment is not limited to this. The outer periphery can have another polygonal shape as required.

In the outer peripheral shape in the cross-section parallel to the magnetic path, as the interior angles of the respective vertex portions are narrowed, the vertex portions tend to reach magnetic saturation easily. In the configuration shown in FIG. 19, the vertexes 34A and 34B adjacent to the gap 33 are processed to have interior angles θ and θ' of at least 100 degrees to provide a shape effect. Due to the shape effect, the magnetic saturation in the portions of the vertexes 34A and 34B is suppressed and thus the occurrence of the leakage flux from the portions can be suppressed. In this case, the portions of vertexes 34C and 34D adjacent to the vertexes 34A and 34B, respectively, have smaller interior angles. Therefore, leakage flux due to the magnetic saturation might occur in the portions. However, the vertexes 34C and 34D are positioned not in the vicinity of and relatively away from the surfaces of objects to be magnetized in the direct current erasing and signal transfer-recording processes. Therefore, the magnetic flux leaking from the portions does not affect the processes for magnetizing the objects to be magnetized and does not contribute to the deterioration in the quality of reproduced signals as shown in FIG. 12.

As described above, when signals were transfer-recorded using a magnetizing head with the configuration according to the present embodiment, high quality reproduced signals with a large amplitude and a small variation in amplitude depending on the position were obtained stably as in the case of using one shown in FIG. 15.

In FIG. 19, the interior angles θ and θ' were illustrated to be the same, but it is not always necessary for the both to be the same. However, when even one of the interior angles θ and θ' is smaller than 100 degrees, the magnetic saturation at the vertexes 34A and 34B cannot be suppressed sufficiently. That is to say, in the direct current erasing process and the signal transfer-recording process, it is difficult to suppress the magnetic field applied to the object to be magnetized by the magnetic flux leaking from the portions other than the gap to be 20% or less of the magnetic field applied to the object to be magnetized by the magnetic flux leaking from the gap. Consequently, such high quality reproduced signals as shown in FIG. 18 might not be obtained in some cases.

On the other hand, when the interior angles θ and θ' are too wide, the vertexes 34A and 34B are positioned close to the surfaces of objects to be magnetized and magnetic flux leaking from the vertexes may affect the processes of magnetizing the objects to be magnetized in some cases. Therefore, when the interior angles θ and θ' are set to be wider than about 150 degrees, it is necessary to set the distances between the vertexes 34A and 34C and between the vertexes 34B and 34D to be sufficiently long to prevent the vertexes 34C and 34D from being positioned close to the surface of the objects to be magnetized. In the present invention, the interior angles θ and θ' are set to be about 100 degrees to 120 degrees, and the distances between the vertexes 34A and 34C and between the vertexes 34B and 34D to be at least about 1 mm. According to this, the effect of the present invention can be obtained sufficiently and high quality reproduced signals as shown in FIG. 18 can be obtained stably.

A magnetizing head shown in FIG. 19 also is an example in which the whole magnetic core is formed of a permanent magnet material as in the configuration shown in FIG. 15. The first magnetic core half 31 and the second magnetic core half 32 are magnetized uniformly in a direction along the annular magnetic path of the magnetic circuit formed of the first and second magnetic core halves 31 and 32. As the permanent magnet material used for the first and second magnetic core halves 31 and 32, the same materials as those used in the configuration shown in FIG. 15 can be used.

Fourth Embodiment

Figure 20:
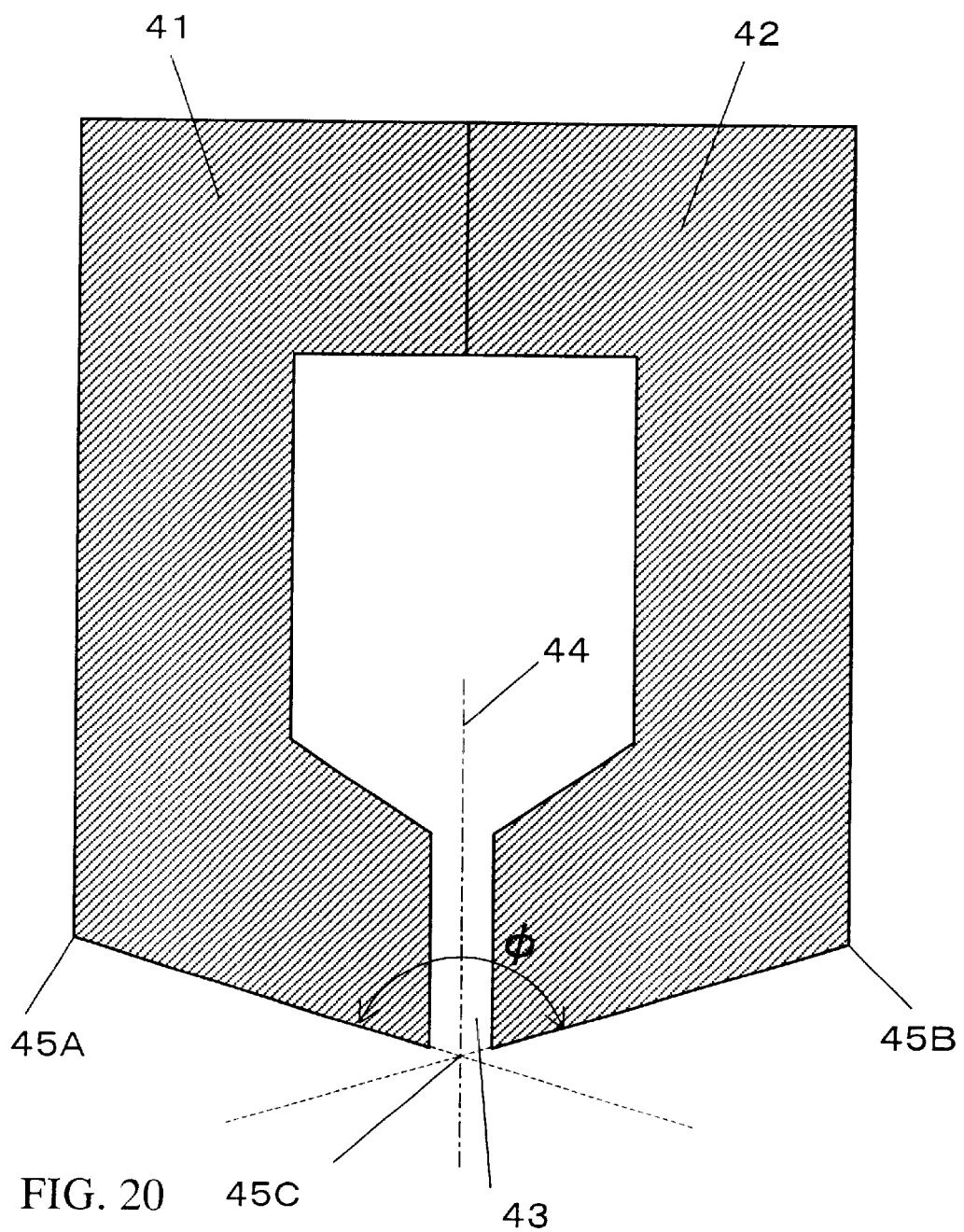
FIG. 20 is a sectional view showing an example of a magnetizing head used in a fourth embodiment of the present invention.

A magnetizing head according to a fourth embodiment shown in FIG. 20 is a third example of the magnetizing head used in the recording method of the present invention. FIG. 20 shows a cross-section parallel to an annular magnetic path of a magnetic circuit, i.e. a cross-section in a track-length direction of information signals, for example, in a circumferential direction of a disc-shaped magnetic recording medium. This magnetizing head includes opposed first and second magnetic core halves 41 and 42 with yoke shapes forming an annular magnetic circuit with a gap 43. Its outer periphery in the cross-section parallel to the annular magnetic path of the magnetic circuit is formed to have a substantially polygonal shape with a supposed vertex 45C, on a center line 44 of the gap 43 in the vicinity of the gap 43, whose interior angle φ is in the range between 100 and 170 degrees.

In the magnetizing head shown in FIG. 20, its outer periphery has a substantially pentagonal shape, but the present embodiment is not limited to this. The outer periphery can have another polygonal shape as required.

In the configuration shown in FIG. 20, the vertexes 45A and 45B adjacent to the gap 43 have small interior angles and may cause leakage flux due to the magnetic saturation. However, when the supposed vertex 45C is provided on the center line 44 of the gap 43 in the vicinity of the gap and the interior angle φ of the vertex 45C is set to be 170 degrees or smaller, the vertexes 45A and 45B are positioned not in the vicinity of but at a sufficient distance from the surface of objects to be magnetized in the direct current erasing and signal transfer-recording processes. Therefore, unless the distances between the vertexes 45A and 45C and between the vertexes 45B and 45C are set to be extremely short, the magnetic flux leaking from the vertexes 45A and 45B tends not to affect the processes of magnetizing the objects to be magnetized and thus does not contribute to the deterioration in the quality of reproduced signals as shown in FIG. 12.

As described above, even when signals are transfer-recorded using a magnetizing head with the configuration of the present embodiment, as in the case of using that shown in FIG. 15, high quality reproduced signals with a large amplitude and a small variation in the amplitude depending on the position can be obtained stably.

On the other hand, when the interior angle φ is too narrow, a gap edge portion on the peripheral side of the annular magnetic path tends to reach the magnetic saturation easily and the leakage flux from the gap portion tends to leak inside the annular magnetic path easily. In other words, sufficient leakage flux to the outside of the annular magnetic path, which contributes as magnetic fields for the direct current erasing and direct current excitation, cannot be obtained in the direct current erasing process and the signal transfer-recording process, resulting in the deterioration in signal quality, which should be taken into consideration. In the present invention, therefore, the interior angle φ is set to be in the range between about 100 and 170 degrees and the distances between the vertexes 45A and 45C and between the vertexes 45B and 45C to be at least about several millimeters. Thus, the effects of the present invention were obtained sufficiently, and high quality reproduced signals as shown in FIG. 18 were obtained stably.

A magnetizing head shown in FIG. 20 also is an example in which the whole magnetic core is formed of a permanent magnet material as in the configuration shown in FIG. 15. The first magnetic core half 41 and the second magnetic core half 42 are magnetized uniformly in a direction along the annular magnetic path of the magnetic circuit formed of the first and second magnetic core halves 41 and 42. As the permanent magnet material used for the first and second magnetic core halves 41 and 42, the same materials as those used in the configuration shown in FIG. 15 can be used.

Figure 21:
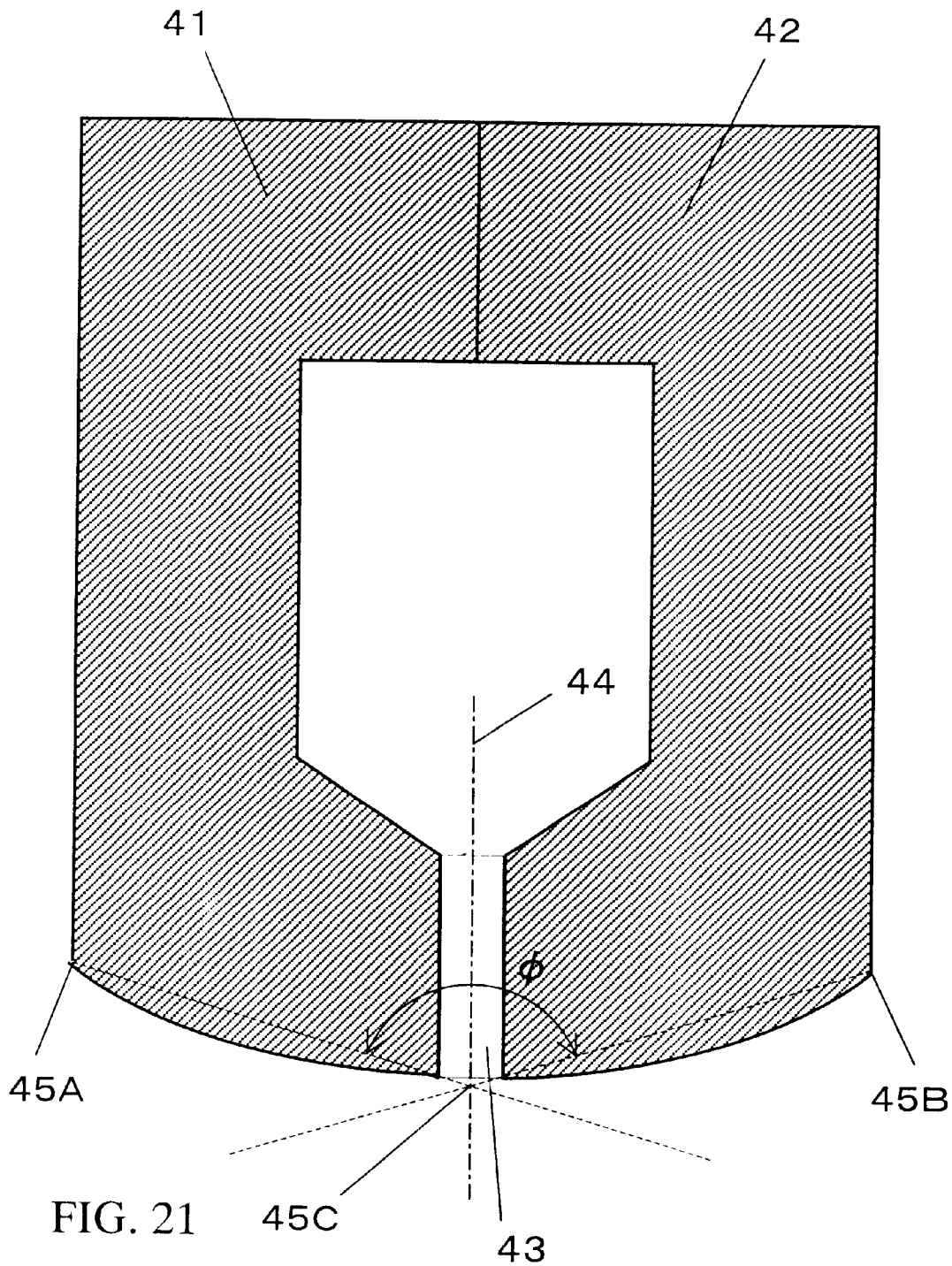
FIG. 21 is a sectional view showing a modified example of the magnetizing head shown in FIG. 20.

In the configuration of the present embodiment, a configuration shown in FIG. 21 also may be employed. That is to say, in an example shown in FIG. 21, an annular magnetic circuit with a gap 43 is formed of opposed first and second magnetic core halves 41 and 42, and the sides extending between the supposed vertex 45C on the center line 44 of the gap 43 and the vertex 45A and between the supposed vertex 45C and the vertex 45B have a curved shape. This allows the magnetic saturation in the vicinity of the gap edge on the outer peripheral side of the annular magnetic path to be suppressed even in the case where the interior angle φ is a relatively small. Therefore, sufficient leakage flux to the outside of the annular magnetic path can be obtained, which contributes as magnetic fields for the direct current erasing and the direct current excitation.

Fifth Embodiment

Figure 22:
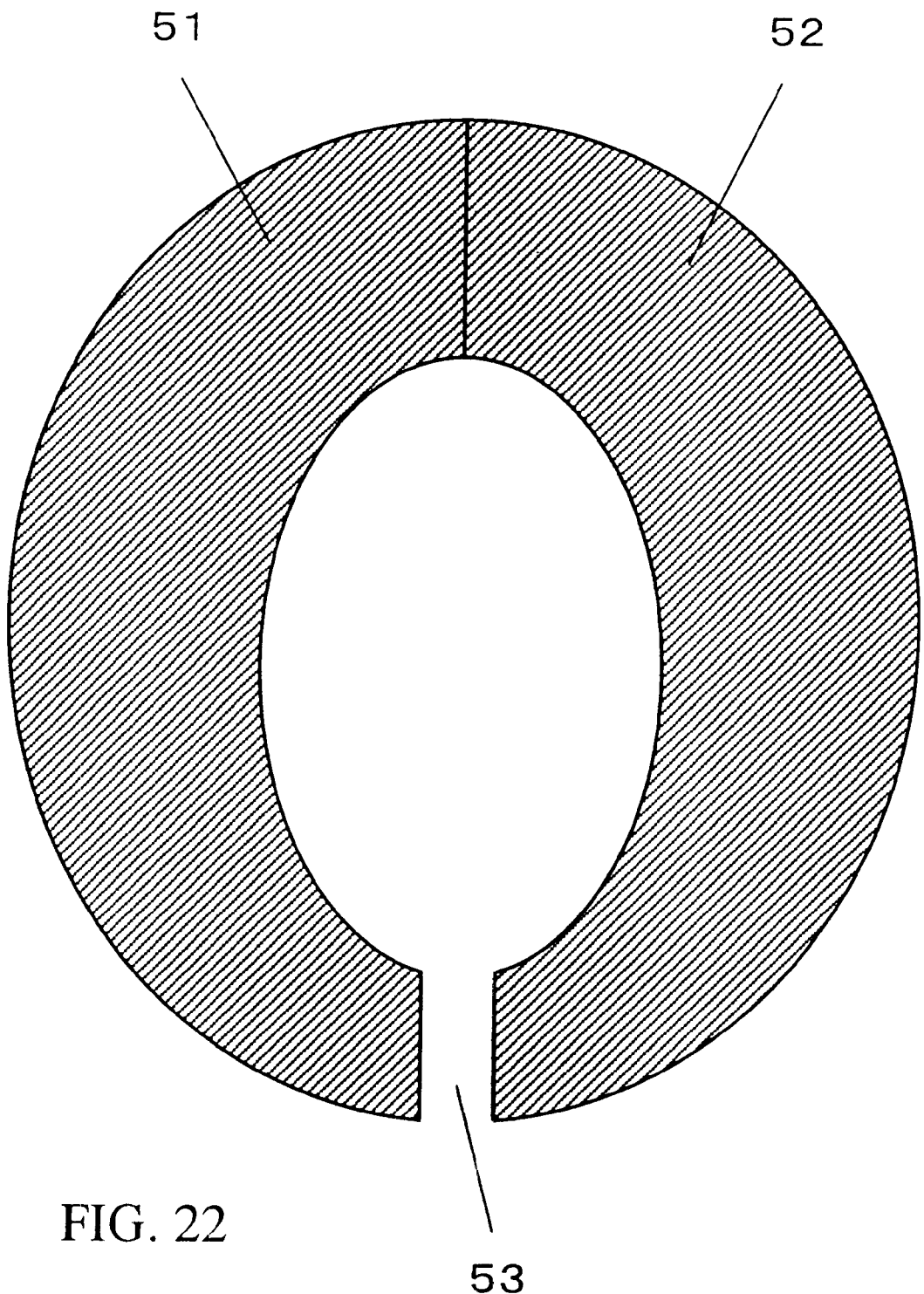
FIG. 22 is a sectional view showing an example of a magnetizing head used in a fifth embodiment of the present invention.

A magnetizing head according to a fifth embodiment shown in FIG. 22 is a fourth example of the magnetizing head used in the recording method of the present invention. FIG. 22 shows a cross-section parallel to an annular magnetic path of a magnetic circuit, i.e. a cross-section in a track-length direction of information signals, for example, in a circumferential direction of a disc-shaped magnetic recording medium. This magnetizing head includes opposed first and second magnetic core halves 51 and 52 with yoke shapes forming an annular magnetic circuit with a gap 53. Its outer periphery in the cross-section parallel to the annular magnetic path of the magnetic circuit is formed to have a substantially elliptical shape including no vertex.

In the magnetizing head with the conventional configuration shown in FIG. 2, the vertex portions adjacent to the gap in the outer peripheral shape of a cross-section parallel to the annular magnetic path reach magnetic saturation locally, resulting in the deterioration in signal quality due to the influence of the leakage flux leaking from the portions. On the other hand, in the configuration shown in FIG. 22, the outer peripheral shape of the cross-section parallel to the annular magnetic path has no vertex except for the gap edge portion. Therefore, this configuration can achieve the configuration of the present invention most reliably in which the magnetic field applied to the object to be magnetized by the magnetic flux leaking from the portion other than the gap 53 of the magnetizing head is suppressed to be 20% or less of the magnetic field applied to the object to be magnetized by the magnetic flux leaking from the gap 53.

Thus, similarly, when signals are transfer-recorded using a magnetizing head with the configuration of the present embodiment, as in the case of using that shown in FIG. 15, high quality reproduced signals with a large amplitude and a small variation in the amplitude depending on the position can be obtained stably.

The magnetizing head shown in FIG. 22 also is an example in which the whole magnetic core is formed of a permanent magnet material as in the configuration shown in FIG. 15. The first magnetic core half 51 and the second magnetic core half 52 are magnetized uniformly in a direction along the annular magnetic path of the magnetic circuit formed of the first and second magnetic core halves 51 and 52. As the permanent magnet material used for the first and second magnetic core halves 51 and 52, the same materials as those used in the configuration shown in FIG. 1 can be used.

Sixth Embodiment

Figure 23:
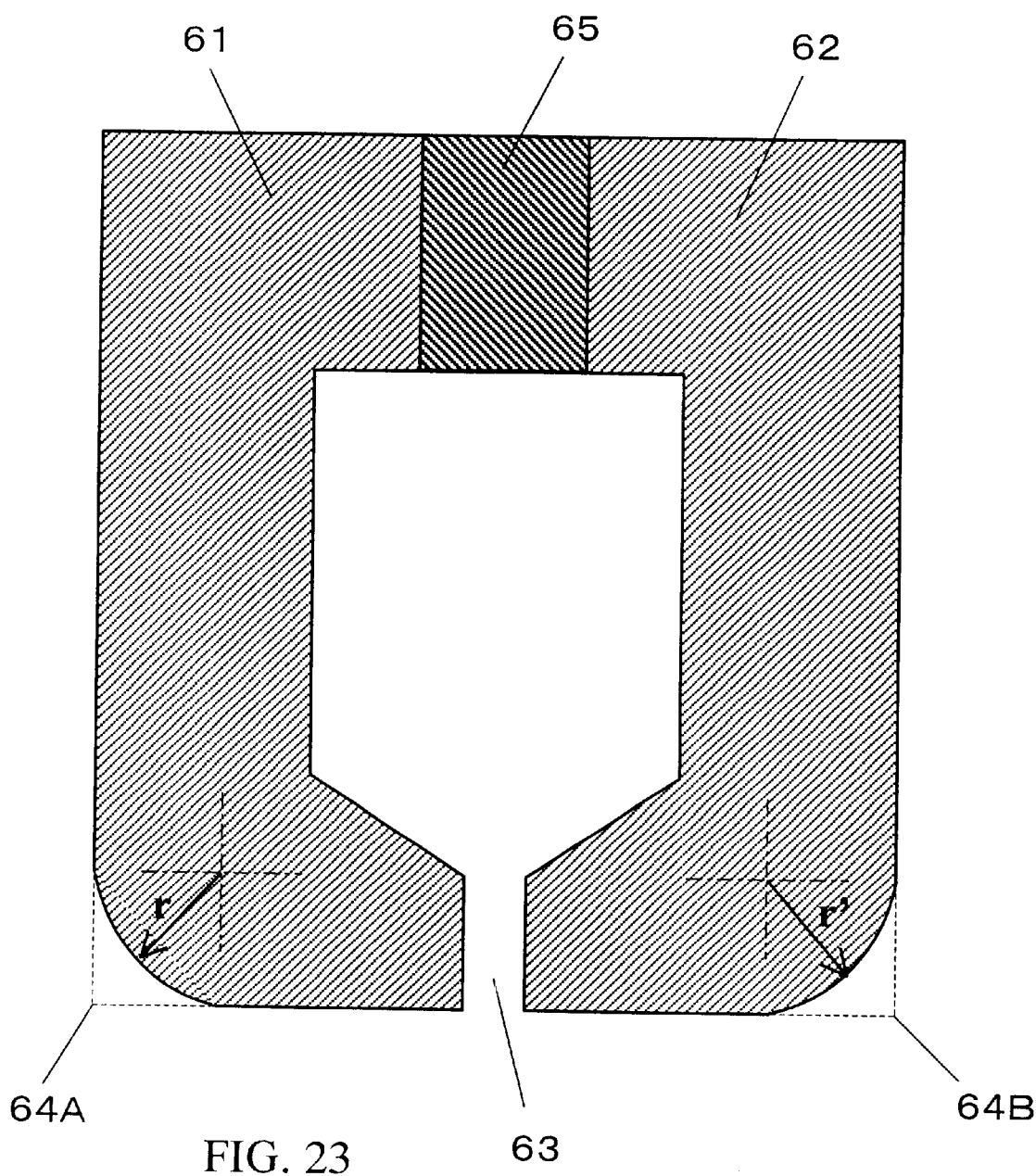
FIG. 23 is a sectional view showing an example of a magnetizing head used in a sixth embodiment of the present invention.

A magnetizing head according to a sixth embodiment shown in FIG. 23 is a fifth example of the magnetizing head used in the recording method of the present invention. FIG. 23 shows a cross-section parallel to an annular magnetic path of a magnetic circuit, i.e. a cross-section in a track-length direction of information signals, for example, in a circumferential direction of a disc-shaped magnetic recording medium. This magnetizing head includes opposed first and second magnetic core halves 61 and 62 with yoke shapes forming an annular magnetic circuit with a gap 63. Its outer periphery in the cross-section parallel to the annular magnetic path is basically the same as that of the embodiment shown in FIG. 15 and is a substantially polygonal shape in which vertexes 64A and 64B are formed to have curved shapes with curvatures of radii r and r' of at least 0.5 mm. As in the embodiment shown in FIG. 15, the outer periphery has a substantially rectangular shape, but can have another polygonal shape as required. In addition to the above-mentioned configuration, the magnetizing head according to the present embodiment has a configuration in which the first and second magnetic core halves 61 and 62 are positioned opposing each other with a permanent magnet 65 being interposed therebetween.

In the configuration shown in FIG. 23, therefore, as the material forming the first and second magnetic core halves 61 and 62, not only the permanent magnet material but also various kinds of ferromagnetic materials with soft magnetism or semi-hard magnetism can be used. In this case, preferably, the ferromagnetic material forming the first and second magnetic core halves 61 and 62 has a sufficiently high saturation magnetic flux density so as not to cause considerable magnetic saturation locally due to the magnetic flux applied from the permanent magnet 65. For example, Fe, a Fe—Co alloy, a Fe—Si based soft magnetism alloy, or the like can be used.

As described above, in the embodiments shown in FIGS. 15 to 22, it is required to magnetize the first and second magnetic core halves with yoke shapes uniformly in a direction along the annular magnetic path of the magnetic circuit formed of the first and second magnetic core halves. Depending on the core shape, however, the uniform magnetization in the direction along the annular magnetic path may be difficult in some cases. On the other hand, in the configuration shown in FIG. 23, it is enough that only the permanent magnet 65 is magnetized uniformly in a direction along the annular magnetic path of the magnetic circuit formed together with the first and second magnetic core halves 61 and 62, i.e. in a transverse direction on the paper showing FIG. 23. In addition, for the permanent magnet 65, generally a block-type permanent magnet with a rectangular body shape can be used. Therefore, the magnetizing head according to the present embodiment can be manufactured more easily at a lower cost as compared to the aforementioned magnetizing heads.

In the configuration shown in FIG. 23, preferably, for the permanent magnet 65, one with a residual magnetic flux density of at least 1.0 tesla and a coercive force of at least 10000 oersted (796 kA/m) is used as in the case of the magnetic cores in the above-mentioned configuration. As the permanent magnet with such characteristics, a rare-earth magnet containing a material of Nd—Fe—B, Sm—Co, or the like as a main component can be used.

In the example shown in FIG. 23, the outer peripheral shape in the cross-section parallel to the annual magnetic path of the magnetizing head is the same as that of the example shown in FIG. 15. However, the configuration according to the present embodiment also can be applied to the outer peripheral shapes corresponding to the embodiments shown in FIGS. 19 to 22.

Seventh Embodiment

Figure 24:
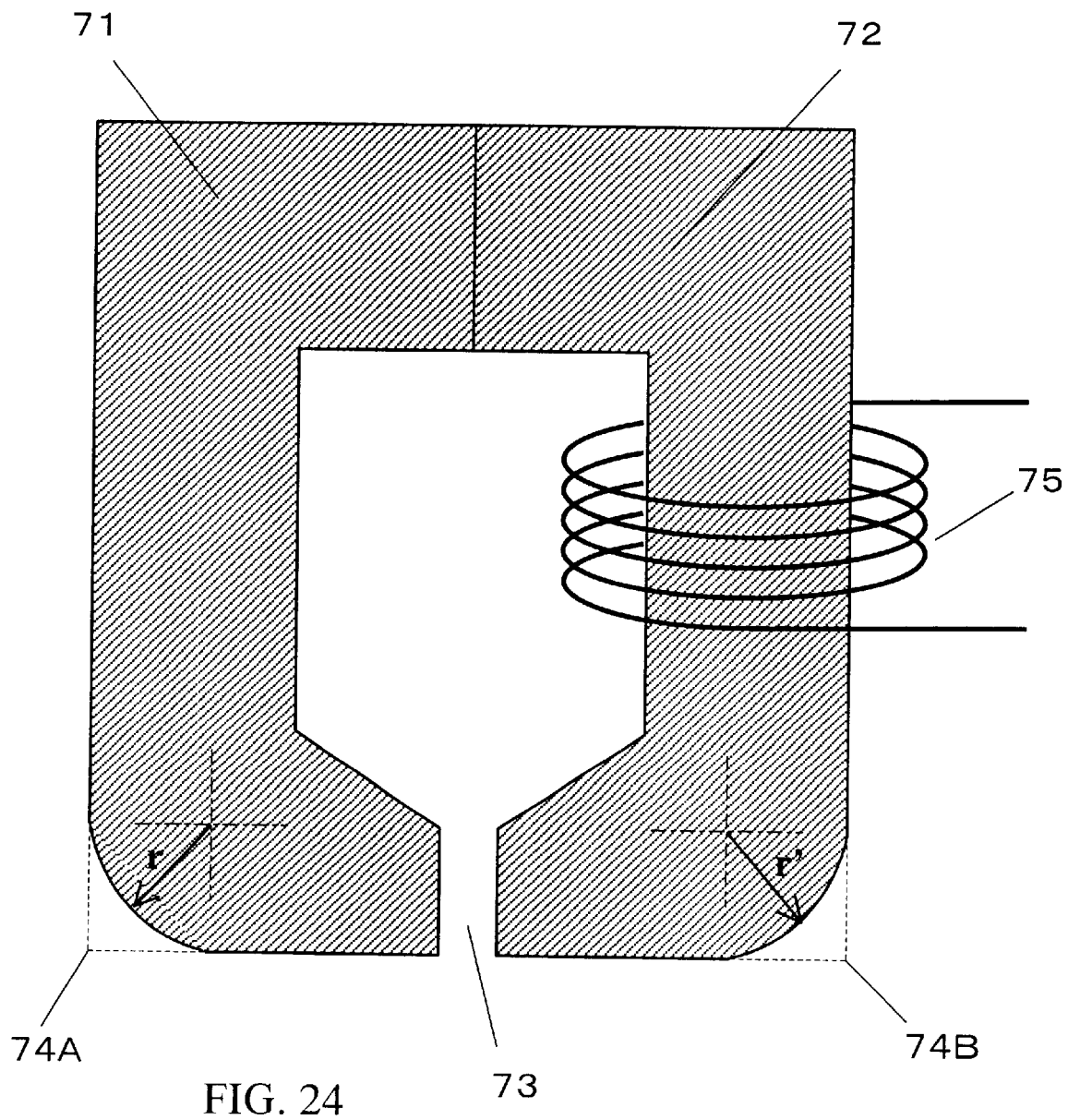
FIG. 24 is a sectional view showing an example of a magnetizing head used in a seventh embodiment of the present invention.

A magnetizing head according to a seventh embodiment shown in FIG. 24 is a sixth example of the magnetizing head used in the recording method of the present invention. FIG. 24 shows a cross-section parallel to an annular magnetic path of a magnetic circuit, i.e. a cross-section in a track-length direction of information signals, for example, in a circumferential direction of a disc-shaped magnetic recording medium. This magnetizing head includes opposed first and second magnetic core halves 71 and 72 with yoke shapes forming an annular magnetic circuit with a gap 73. Its outer periphery in the cross-section parallel to the annular magnetic path has basically the same shape as that of the embodiment shown in FIG. 15 and is a substantially polygonal shape in which vertexes 74A and 74B are formed to have curved shapes with curvatures of radii r and r' of at least 0.5 mm. As in the embodiment shown in FIG. 15, the outer periphery has a substantially rectangular shape, but can have another polygonal shape as required. In addition to the above-mentioned configuration, the magnetizing head according to the present embodiment has a configuration in which a coil 75 is provided around at least one of the first and second magnetic core halves 71 and 72 for exciting them with a direct current. In the example shown in FIG. 24, the coil 75 is provided around the second magnetic core half 72.

As described above, in the aforementioned embodiments, the first and second magnetic core halves with yoke shapes are required to be magnetized uniformly in the direction along the annular magnetic path of the magnetic circuit formed of the magnetic core halves, but it may be difficult depending on the core shapes in some cases. On the other hand, in the configuration according to the present embodiment, since the core is excited with a current flowing in the coil 75, it is not necessary to provide a permanent magnet as an element of the magnetic core, thus solving the troublesomeness of the magnetization in a proper direction. Furthermore, the material forming the first and second magnetic core halves 71 and 72 may not be a permanent magnetic material, and therefore, various kinds of ferromagnetic materials with soft magnetism or semi-hard magnetism can be used.

In the configuration shown in FIG. 24, preferably, the ferromagnetic material forming the first and second magnetic core halves 71 and 72 has a sufficiently high saturation magnetic flux density so as to apply sufficient magnetic fields for the direct current erasing and the direct current excitation by the leakage flux from the gap 73. For that purpose, for example, Fe, a Fe—Co alloy, a Fe—Si based soft magnetism alloy, or the like can be used as the ferromagnetic material. In the magnetizing head shown in FIG. 24, the outer peripheral shape in the cross-section parallel to the annual magnetic path is the same as that in the configuration shown in FIG. 15. However, the configuration according to the present embodiment also can be applied to the outer peripheral shapes corresponding to the embodiments shown in FIGS. 19 to 22.

As described above, the magnetizing head used in the recording method of the present invention may have various forms. When the spacing between such a magnetizing head and a magnetic recording medium is set to be within a proper range, the configuration of the present invention can be achieved reliably, in which the magnetic field applied to the object to be magnetized by the magnetic flux leaking from the portion other than the gap is suppressed to be 20% or less of the magnetic field applied to the object to be magnetized by the magnetic flux leaking from the gap. Furthermore, in this case, a sufficiently great tolerance of the spacing between the magnetizing head and the magnetic recording medium can be obtained. Therefore, even in the case where the spacing is varied to some degree when the magnetizing head is moved relative to the magnetic recording medium in the direct current erasing process and the signal transfer-recording process, high grade reproduced signals can be obtained stably. Therefore, also in view of the assurance of product quality in mass production and the improvement in production yield, preformat recording with a sufficient performance margin can be carried out.

In the above description, the main consideration was given to the application to a magnetic disk medium to be incorporated in a hard disk drive or the like. However, the present invention is not limited thereto. The present invention also can be applied to a magnetic recording medium such as a flexible magnetic disk, a magnetic card, a magnetic tape, and the like, and thereby the same effects as in the above can be obtained.

Moreover, with respect to the description of information signals to be recorded in a magnetic recording medium, main consideration was given to the preformat signals such as tracking servo signals, address information signals, reproduction clock signals, or the like, but the information signals with respect to which the configuration of the present invention can be applied also are not limited thereto. For example, using the configuration of the present invention, it also is possible on the principle to record various data signals and audio and video signals. In this case, the master information carrier of the present invention and the recording technique with respect to a magnetic recording medium using the same enables mass copy production of soft disk media to be carried out.

INDUSTRIAL APPLICABILITY

According to the present invention, high density information signals can be recorded uniformly and stably with high productivity in a short time on a magnetic recording medium, particularly a disc-shaped magnetic recording medium such as a fixed hard disk medium, a removable hard disk medium, a large capacity flexible medium, or the like. In addition, when information signals of the master information carrier are transfer-recorded in a magnetic recording medium, the quality of the transfer-recorded signals does not deteriorate, thus providing recording technique in which excellent signal quality can be obtained in view of the assurance of product quality in mass production and the improvement in production yield.

What is claimed is:

1. A method of recording magnetically on a magnetic recording medium, using a master information carrier with an arranged pattern composed of magnetic portions of a ferromagnetic film on a substrate, the magnetic portion being formed in a shape corresponding to predetermined information signals, the method comprising:

superposing the master information carrier on a magnetic recording medium with the magnetic portions facing the magnetic recording medium; and magnetizing the magnetic portions of the master information carrier with a magnetizing head to transfer-record the arranged pattern formed in the master information carrier into the magnetic recording medium as a magnetized pattern, wherein the magnetizing head includes an annular magnetic circuit with a gap, and a strength of a magnetic field applied to the master information carrier by magnetic flux leaking from portions other than the gap is set to be 20% or less of that of a magnetic field applied to the master information carrier by magnetic flux leaking from the gap.

2. The method of recording magnetically on a magnetic recording medium according to claim 1, wherein the magnetizing head includes a first magnetic core half and a second magnetic core half, the first magnetic core half and the second magnetic core half oppose each other to form an annular magnetic circuit with a gap, and an outer periphery in a cross-section parallel to an annular magnetic path of the magnetic circuit has a substantially polygonal shape in which at least vertexes adjacent to the gap are formed to have a curved shape with a curvature of a radius of at least 0.5 mm.

3. The method of recording magnetically on a magnetic recording medium according to claim 1, wherein the magnetizing head includes a first magnetic core half and a second magnetic core half, the first magnetic core half and the second magnetic core half oppose each other to form an annular magnetic circuit with a gap, and an outer periphery in a cross-section parallel to an annular magnetic path of the magnetic circuit has a substantially polygonal shape in which at least vertexes adjacent to the gap have an interior angle of at least 100 degrees.

4. The method of recording magnetically on a magnetic recording medium according to claim 1, wherein the magnetizing head includes a first magnetic core half and a second magnetic core half, the first magnetic core half and the second magnetic core half oppose each other to form an annular magnetic circuit with a gap, and an outer periphery in a cross-section parallel to an annular magnetic path of the magnetic circuit has a substantially polygonal shape with a supposed vertex that is positioned on a center line of the gap in the vicinity of the gap and has an internal angle in a range between 100 and 170 degrees.

5. The method of recording magnetically on a magnetic recording medium according to claim 4, wherein sides adjacent to the supposed vertex on the center line of the gap in the magnetizing head have an outwardly curved shape.

6. The method of recording magnetically on a magnetic recording medium according to claim 1, wherein the magnetizing head includes a first magnetic core half and a second magnetic core half, the first magnetic core half and the second magnetic core half oppose each other to form an annular magnetic circuit with a gap, and an outer periphery in a cross-section parallel to an annular magnetic path of the magnetic circuit has a substantially elliptical shape with no vertex.

7. The method of recording magnetically on a magnetic recording medium according to claim 2, wherein at least one of the first magnetic core half and the second magnetic core half of the magnetizing head is formed of a permanent magnet.

8. The method of recording magnetically on a magnetic recording medium according to claim 2, wherein the first magnetic core half and the second magnetic core half of the magnetizing head are positioned to oppose each other with a permanent magnet being interposed therebetween.

9. The method of recording magnetically on a magnetic recording medium according to claim 2, wherein a coil for direct current excitation is provided around at least one of the first magnetic core half and the second magnetic core half of the magnetizing head.

10. The method of recording magnetically on a magnetic recording medium according to claim 1, wherein prior to transfer-recording using a master information carrier, a magnetic field for direct current erasing is applied to a magnetic recording medium with a magnetizing head to magnetize the magnetic recording medium in one direction, then the master information carrier is superposed on the magnetic recording medium magnetized in the one direction, and a magnetic field with the opposite polarity to that of the magnetic field for direct current erasing is applied to magnetic portions of the master information carrier with the magnetizing head, thus transfer-recording the arranged pattern formed in the master information carrier into the magnetic recording medium as a magnetized pattern.

11. A magnetic recording/reproducing device, comprising a magnetic recording medium that has been subjected to preformat recording using a method of recording magnetically on a magnetic recording medium according to claim 1.

12. A hard disk drive, comprising a disc-shaped magnetic recording medium incorporated therein, wherein the disc-shaped magnetic recording medium has a magnetic film into which a magnetized pattern corresponding to predetermined information signals has been transfer-recorded according to a method of recording magnetically on a magnetic recording medium according to claim 1.

13. A magnetizing head, for transfer-recording of an arranged pattern formed in a master information carrier into a magnetic recording medium as a magnetized pattern using the master information carrier, the arranged pattern being formed of magnetic portions of a ferromagnetic film on a substrate and being formed in a shape corresponding to predetermined information signals, the magnetizing head comprising:
a first magnetic core half and a second magnetic core half, which oppose each other to form an annular magnetic circuit with a gap; and
a magnetic flux generation portion for generating magnetic flux passing through the magnetic circuit,
wherein a strength of a magnetic field applied to the master information carrier by magnetic flux leaking from portions other than the gap is set to be 20% or less of that of a magnetic field applied to the master information carrier by magnetic flux leaking from the gap.

14. The magnetizing head according to claim 13, wherein an outer periphery in a cross-section parallel to an annular magnetic path of the magnetic circuit has a substantially polygonal shape in which at least vertexes adjacent to the gap are formed to have a curved shape with a curvature of a radius of at least 0.5 mm.

15. The magnetizing head according to claim 13, wherein an outer periphery in a cross-section parallel to an annular magnetic path of the magnetic circuit has a substantially polygonal shape in which at least vertexes adjacent to the gap have an interior angle of at least 100 degrees.

16. The magnetizing head according to claim 13, wherein an outer periphery in a cross-section parallel to an annular magnetic path of the magnetic circuit has a substantially polygonal shape with a supposed vertex positioned on a center line of the gap in the vicinity of the gap and the supposed vertex has an internal angle in a range between 100 and 170 degrees.

17. The magnetizing head according to claim 16, wherein sides adjacent to the supposed vertex on the center line of the gap have an outwardly curved shape.

18. The magnetizing head according to claim 13, wherein an outer periphery in a cross-section parallel to an annular magnetic path of the magnetic circuit has a substantially elliptical shape with no vertex.

19. The magnetizing head according to claim 13, wherein at least one of the first magnetic core half and the second magnetic core half is formed of a permanent magnet.

20. The magnetizing head according to claim 13, wherein the first magnetic core half and the second magnetic core half are positioned to oppose each other with a permanent magnet being interposed therebetween.

21. The magnetizing head according to claim 13, further comprising a coil for direct current excitation, wherein the coil is provided around at least one of the first magnetic core half and the second magnetic core half.

22. A magnetic recording/reproducing device, comprising a magnetic recording medium that has been subjected to preformat recording using a method of recording magnetically on a magnetic recording medium according to claim 10.

23. A hard disk drive, comprising a disc-shaped magnetic recording medium incorporated therein, wherein the disc-shaped magnetic recording medium has a magnetic film into which a magnetized pattern corresponding to predetermined information signals has been transfer-recorded according to a method of recording magnetically on a magnetic recording medium according to claim 10.

* * * * *